US011405059B2

(12) United States Patent
Pehlke

(10) Patent No.: US 11,405,059 B2
(45) Date of Patent: Aug. 2, 2022

(54) MOBILE DEVICE FRONT END ARCHITECTURE FOR ANTENNA PLEXING FOR MULTIPLE FREQUENCY BANDS

(71) Applicant: Skyworks Solutions, Inc., Irvine, CA (US)

(72) Inventor: David Richard Pehlke, Westlake Village, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 0 days.

(21) Appl. No.: 17/135,085

(22) Filed: Dec. 28, 2020

(65) Prior Publication Data

US 2021/0218424 A1 Jul. 15, 2021

Related U.S. Application Data

(60) Provisional application No. 62/958,872, filed on Jan. 9, 2020, provisional application No. 62/958,875, filed on Jan. 9, 2020.

(51) Int. Cl.
| | |
|---|---|
| *H04L 5/12* | (2006.01) |
| *H04L 23/02* | (2006.01) |
| *H04B 1/00* | (2006.01) |
| *H04W 88/06* | (2009.01) |
| *H04B 1/40* | (2015.01) |
| *H04B 1/04* | (2006.01) |

(52) U.S. Cl.
CPC .......... *H04B 1/006* (2013.01); *H04B 1/0078* (2013.01); *H04B 1/0483* (2013.01); *H04B 1/40* (2013.01); *H04W 88/06* (2013.01)

(58) Field of Classification Search
CPC .... H04B 1/006; H04B 1/0078; H04B 1/0483; H04B 1/40; H04B 1/18; H04B 1/0458; H04B 1/0057; H04B 1/0064; H04W 88/06
USPC ........................................................ 375/262
See application file for complete search history.

(56) References Cited

U.S. PATENT DOCUMENTS

| | | | |
|---|---|---|---|
| 9,172,441 B2* | 10/2015 | Granger-Jones | ....... H04B 1/006 |
| 9,385,765 B2 | 7/2016 | Wloczysiak | |
| 9,485,001 B2 | 11/2016 | Wloczysiak | |
| 9,571,037 B2 | 2/2017 | Wloczysiak | |
| 9,621,327 B2 | 4/2017 | Chang et al. | |
| 9,667,324 B2 | 5/2017 | Wloczysiak | |
| 9,735,737 B2 | 8/2017 | Gorbachov et al. | |
| 9,768,941 B2 | 9/2017 | Pehlke | |
| 9,806,787 B2 | 10/2017 | Wloczysiak et al. | |
| 9,813,137 B2 | 11/2017 | Wloczysiak et al. | |
| 9,825,660 B2 | 11/2017 | Wloczysiak et al. | |
| 9,893,752 B2 | 2/2018 | Domino et al. | |
| 9,893,794 B2 | 2/2018 | Wloczysiak | |
| 10,019,335 B2 | 7/2018 | Tule | |
| 10,050,653 B2 | 8/2018 | Pehlivanoglu | |

(Continued)

*Primary Examiner* — Tanmay K Shah
(74) *Attorney, Agent, or Firm* — Knobbe, Martens, Olson & Bear, LLP

(57) ABSTRACT

A switching circuit comprises a first filter, a second filter and a plurality of switches. The first filter is configured to filter a first frequency band, a second frequency band that is adjacent to the first frequency band and a gap band between the first frequency band and the second frequency band. The second filter is configured to filter the second frequency band. The plurality of switches is configured to route signals from an antenna through one of the first filter and second filter.

21 Claims, 12 Drawing Sheets

(56) References Cited

U.S. PATENT DOCUMENTS

| | | |
|---|---|---|
| 10,050,694 B2 | 8/2018 | Wloczysiak |
| 10,069,615 B2 | 9/2018 | Chang et al. |
| 10,075,199 B2 | 9/2018 | King et al. |
| 10,103,772 B2 | 10/2018 | Pehlke et al. |
| 10,122,422 B2 | 11/2018 | Wloczysiak |
| 10,135,469 B2 | 11/2018 | Chang et al. |
| 10,200,077 B2 | 2/2019 | Liu et al. |
| 10,205,490 B2 | 2/2019 | Wloczysiak |
| 10,211,857 B2 | 2/2019 | King et al. |
| 10,218,390 B2 | 2/2019 | Wloczysiak et al. |
| 10,218,427 B2 | 2/2019 | Wloczysiak |
| 10,250,191 B2 | 4/2019 | Gorbachov et al. |
| 10,256,850 B2 | 4/2019 | Wloczysiak |
| 10,256,851 B2 | 4/2019 | Pehlke et al. |
| 10,257,119 B2 | 4/2019 | Wloczysiak et al. |
| 10,374,650 B2 | 8/2019 | Pehlke et al. |
| 10,432,274 B2 | 10/2019 | Pehlke |
| 10,439,665 B2 | 10/2019 | Domino et al. |
| 10,439,685 B2 | 10/2019 | Pehlke et al. |
| 10,447,317 B2 | 10/2019 | Chang et al. |
| 10,447,442 B2 | 10/2019 | Pehlke et al. |
| 10,454,506 B2 | 10/2019 | King et al. |
| 10,484,053 B2 | 11/2019 | Wloczysiak |
| 10,560,139 B2 | 2/2020 | Brunel et al. |
| 10,581,466 B2 | 3/2020 | Pehlke |
| 10,587,291 B2 | 3/2020 | Pehlke et al. |
| 10,608,590 B2 | 3/2020 | Gorbachov et al. |
| 10,615,841 B2 | 4/2020 | Liu et al. |
| 10,623,337 B2 | 4/2020 | Wloczysiak et al. |
| 10,637,555 B2 | 4/2020 | Wloczysiak |
| 10,659,121 B2 | 5/2020 | Pehlke |
| 10,666,300 B2 | 5/2020 | Wloczysiak et al. |
| 10,707,905 B2 | 7/2020 | Wloczysiak |
| 10,784,903 B2 | 9/2020 | Wloczysiak et al. |
| 10,826,546 B2 | 11/2020 | Pehlivanoglu |
| 10,873,384 B2 | 12/2020 | Wloczysiak |
| 10,924,160 B2 | 2/2021 | Wloczysiak |
| 10,944,523 B2 | 3/2021 | Pehlke et al. |
| 10,965,021 B2 | 3/2021 | Wloczysiak |
| 11,018,726 B2 | 5/2021 | Pehlke et al. |
| 11,038,543 B2 | 6/2021 | Chang et al. |
| 11,095,575 B2 | 8/2021 | Wloczysiak et al. |
| 11,128,323 B2 | 9/2021 | Pehlke et al. |
| 11,190,223 B2 | 11/2021 | Wloczysiak et al. |
| 11,245,432 B2 | 2/2022 | Farahvash et al. |
| 11,271,602 B2 | 3/2022 | Domino et al. |
| 2005/0277387 A1* | 12/2005 | Kojima .............. H04B 7/04 455/78 |
| 2008/0315396 A1 | 12/2008 | Kuhlman et al. |
| 2014/0073371 A1* | 3/2014 | Mujtaba ............ H04W 24/08 455/515 |
| 2014/0105079 A1* | 4/2014 | Bengtsson ............ H04B 1/005 370/297 |
| 2014/0119245 A1* | 5/2014 | Desjardins ......... H04B 1/0057 370/278 |
| 2014/0321339 A1 | 10/2014 | Pehlke |
| 2015/0036656 A1* | 2/2015 | McCarthy ........... H04B 7/0689 370/331 |
| 2015/0133067 A1 | 5/2015 | Chang et al. |
| 2015/0295596 A1 | 10/2015 | Wloczysiak et al. |
| 2015/0295597 A1 | 10/2015 | Wloczysiak |
| 2015/0296515 A1 | 10/2015 | Pehlivanoglu |
| 2016/0006556 A1 | 1/2016 | Pehlke et al. |
| 2016/0062865 A1 | 3/2016 | Tule |
| 2016/0126987 A1 | 5/2016 | Wloczysiak |
| 2016/0126993 A1 | 5/2016 | Wloczysiak |
| 2016/0126994 A1 | 5/2016 | Domino et al. |
| 2016/0127014 A1 | 5/2016 | Wloczysiak |
| 2016/0127015 A1 | 5/2016 | Wloczysiak et al. |
| 2016/0127016 A1 | 5/2016 | Pehlke et al. |
| 2016/0127025 A1 | 5/2016 | Wloczysiak |
| 2016/0127026 A1 | 5/2016 | Wloczysiak et al. |
| 2016/0127029 A1 | 5/2016 | Wloczysiak |
| 2016/0322997 A1 | 11/2016 | Wloczysiak et al. |
| 2016/0365908 A1 | 12/2016 | Chang et al. |
| 2017/0026061 A1 | 1/2017 | Wloczysiak |
| 2017/0026090 A1 | 1/2017 | Wloczysiak |
| 2017/0047981 A1 | 2/2017 | Wloczysiak |
| 2017/0048028 A1 | 2/2017 | Pehlke et al. |
| 2017/0163215 A1 | 6/2017 | Gorbachov et al. |
| 2017/0195106 A1 | 7/2017 | Pehlke |
| 2017/0222665 A1 | 8/2017 | Chang et al. |
| 2017/0244538 A1 | 8/2017 | Chang et al. |
| 2017/0317648 A1 | 11/2017 | Gorbachov et al. |
| 2017/0317710 A1 | 11/2017 | Liu et al. |
| 2017/0324451 A1 | 11/2017 | Wloczysiak |
| 2017/0373730 A1 | 12/2017 | Pehlke et al. |
| 2018/0019768 A1 | 1/2018 | King et al. |
| 2018/0063031 A1* | 3/2018 | Wloczysiak .......... H04W 40/02 |
| 2018/0076834 A1 | 3/2018 | Wloczysiak et al. |
| 2018/0131500 A1 | 5/2018 | Pehlke |
| 2018/0241424 A1 | 8/2018 | Domino et al. |
| 2018/0294858 A1 | 10/2018 | Pehlke |
| 2018/0351594 A1 | 12/2018 | Wloczysiak et al. |
| 2018/0351628 A1 | 12/2018 | Wloczysiak |
| 2019/0007073 A1 | 1/2019 | King et al. |
| 2019/0097661 A1 | 3/2019 | Chang et al. |
| 2019/0123769 A1 | 4/2019 | Pehlke et al. |
| 2019/0123770 A1 | 4/2019 | Pehlke |
| 2019/0140677 A1 | 5/2019 | Pehlivanoglu |
| 2019/0149178 A1 | 5/2019 | King et al. |
| 2019/0173530 A1 | 6/2019 | Wloczysiak |
| 2019/0181906 A1 | 6/2019 | Liu et al. |
| 2019/0229679 A1 | 7/2019 | Gorbachov et al. |
| 2019/0230051 A1 | 7/2019 | Wloczysiak et al. |
| 2019/0260399 A1 | 8/2019 | Wloczysiak |
| 2019/0268027 A1 | 8/2019 | Wloczysiak et al. |
| 2019/0273314 A1 | 9/2019 | Wloczysiak |
| 2019/0280758 A1 | 9/2019 | Wloczysiak |
| 2019/0305804 A1 | 10/2019 | Pehlke et al. |
| 2020/0106463 A1 | 4/2020 | Chang et al. |
| 2020/0106497 A1 | 4/2020 | Pehlke |
| 2020/0112329 A1 | 4/2020 | Domino et al. |
| 2020/0112348 A1 | 4/2020 | Pehlke et al. |
| 2020/0162114 A1 | 5/2020 | King et al. |
| 2020/0162209 A1 | 5/2020 | Pehlke et al. |
| 2020/0228167 A1 | 7/2020 | Wloczysiak |
| 2020/0244597 A1 | 7/2020 | Wloczysiak et al. |
| 2020/0259549 A1 | 8/2020 | Wloczysiak |
| 2020/0287583 A1 | 9/2020 | Farahvash et al. |
| 2020/0358460 A1 | 11/2020 | Wloczysiak et al. |
| 2020/0358516 A1 | 11/2020 | Wloczysiak |
| 2021/0013908 A1 | 1/2021 | Wloczysiak |
| 2021/0036724 A1 | 2/2021 | Lam |
| 2021/0058124 A1 | 2/2021 | Pehlke |
| 2021/0098897 A1 | 4/2021 | Pehlke et al. |
| 2021/0099199 A1 | 4/2021 | Pehlke et al. |
| 2021/0135690 A1 | 5/2021 | Pehlke |
| 2021/0143789 A1 | 5/2021 | Azizi |
| 2021/0143795 A1 | 5/2021 | Azizi |
| 2021/0143852 A1 | 5/2021 | Pehlke |
| 2021/0175916 A1 | 6/2021 | Pehlivanoglu |
| 2021/0184346 A1 | 6/2021 | Wloczysiak |
| 2021/0211145 A1 | 7/2021 | Loh et al. |
| 2021/0218422 A1 | 7/2021 | Pehlke |
| 2021/0218424 A1 | 7/2021 | Pehlke |
| 2021/0218434 A1 | 7/2021 | Pehlke |
| 2021/0313947 A1 | 10/2021 | Shen et al. |
| 2021/0314007 A1 | 10/2021 | Shen et al. |
| 2021/0314014 A1 | 10/2021 | Shen et al. |
| 2021/0314015 A1 | 10/2021 | Shen et al. |
| 2021/0314016 A1 | 10/2021 | Shen et al. |
| 2022/0038392 A1 | 2/2022 | Wloczysiak et al. |
| 2022/0045710 A1 | 2/2022 | Farahvash et al. |
| 2022/0069846 A1 | 3/2022 | Loh et al. |
| 2022/0069850 A1 | 3/2022 | Loh et al. |

\* cited by examiner

MOBILE DEVICE FRONT END ARCHITECTURE FOR ANTENNA PLEXING FOR MULTIPLE FREQUENCY BANDS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority of U.S. Provisional Patent Application 62/958,872, filed Jan. 9, 2020, titled "Mobile Device Front End Architecture For Multiple Frequency Bands," and U.S. Provisional Patent Application 62/958,875, filed Jan. 9, 2020, titled "Mobile Device Front End Architecture For Multiple Frequency Bands," the disclosures of which are hereby incorporated by reference in their entirety herein.

BACKGROUND

Field of the Invention

The present invention is generally in the field of wireless communication devices, and more particularly, to front end modules for multiple frequency bands.

Description of the Related Art

A front-end module of wireless communication devices are typically configured to filter received radio-frequency (RF) signals. The RF signals can be cellular signals, wireless local area signal (WLAN), e.g., Wi-Fi signals, or the like. Since multiple frequency bands can exist close to each other, the front-end module can be configured to separate frequencies bands adjacent to each other.

SUMMARY

The innovations described in the claims each have several aspects, no single one of which is solely responsible for its desirable attributes. Without limiting the scope of the claims, some prominent features of this disclosure will now be briefly described.

One aspect of this disclosure is a switching circuit for switching radio frequency signals, comprising, for concurrent cellular and Wi-Fi operation, a first filter configured to filter first signals in a first frequency band that is adjacent to a second frequency band, where a gap band is between the first frequency band and the second frequency band; a second filter configured to filter second signals in the second frequency band; and a plurality of switches configured to route radio frequency signals from an antenna through one of the first filter and the second filter.

The first filter can be further configured to filter third signals in a third frequency band that is adjacent to the second frequency band, where a gap band is between the second frequency band and the third frequency band.

The switching circuit can further comprise a third filter configured to filter the first signals in the first frequency band and the third signals in the third frequency band and to pass the second frequency band. The plurality of switches can be configured not to route the signals from the antenna through the first filter and the third filter at the same time. The second filter can be further configured to filter a third frequency band that is adjacent to the second frequency band, where a gap band can be between the second frequency band and the third frequency band.

The switching circuit can further comprise a third filter configured to filter the third frequency band that is adjacent to the second frequency band. The switching circuit can further comprise a fourth filter configured to filter the first frequency band. The plurality of switches can be further configured to route the signals from the antenna through the third filter and the first filter. The plurality of switches can be further configured to route the signals from the antenna through the second filter and the fourth filter.

The first and the third frequency bands can be cellular bands and the second frequency band is a wireless local area network band. The switching circuit can further comprise a third filter configured to filter another wireless local area network band. The plurality of switches can be further configured to route the signals from the antenna through the first filter and the third filter.

Another aspect of this disclosure is a front end module comprising a switching circuit for concurrent cellular and Wi-Fi operation that includes a first filter configured to filter first signal in a first frequency band that is adjacent to a second frequency band, where a gap band is between the first frequency band and the second frequency band, a second filter configured to filter second signals in the second frequency band that is adjacent to the first frequency band, and a first plurality of switches configured to route radio frequency signals from an antenna through one of the first filter and second filters; and an amplifier assembly configured to receive the radio frequency signals from the switching circuit and amplify the radio frequency signals.

The front end module can further comprise an impedance matching circuit in communication with the switching circuit and configured to adjust impedance of a path between the antenna and the first and the second filters. The amplifier assembly can include a first power amplifier configured to amplify the first frequency band, a second power amplifier configured to amplify the second frequency band, and a second plurality of switches configured to route the signals to one of the first power amplifier and the second power amplifier. The front end module can further comprise an impedance matching circuit connected to the amplifier assembly and configured to adjust impedance of a path between the switching circuit and the first and the second amplifiers. The amplifier assembly can include a converged power amplifier configured to amplify the first frequency band and the second frequency band.

Another aspect of this disclosure is a switching circuit comprising, for concurrent cellular and Wi-Fi operation, a first filter configured to filter first signals in a first frequency band that is adjacent to a second frequency band, where a gap band is the first frequency band and the second frequency band; a second filter configured to filter second signals in a third frequency band that is adjacent to the second frequency band; a third filter configured to filter third signals in a fourth frequency band that is adjacent to the third frequency band; and a plurality of switches configured to route radio frequency signals from an antenna through (i) the first and second filters, or (ii) the third filter.

The switching circuit can further comprise a fourth filter configured to filter fourth signals in the second frequency band. The first frequency band, the second frequency band, and the fourth frequency band can be cellular bands, and the third frequency band can be a wireless local area network band. A first gap band between the third frequency band and the second frequency band can be larger than a second gap band between the first frequency band and the second frequency band.

One aspect of this disclosure is a radio frequency circuit comprising a first power amplifier configured to amplify signals of a first frequency band; a second power amplifier configured to amplify signals of at least one of a second frequency band and a third frequency band, the first frequency band being disposed between the second and the third frequency bands; a low noise amplifier configured to amplify signals of the first, the second and the third frequency bands; and a plurality of switches configured to route the signals through at least one of the first power amplifier, the second power amplifiers and the third power amplifier.

The first frequency band can be a wireless local area network band and the second and the third frequency bands can be cellular bands. The second power amplifier can be further configured amplify signals of a fourth frequency band. The plurality of switches can be configured to connect the first and the second amplifiers and the low noise amplifier with at least one of a plurality of filters, where the plurality of filters can be configured to filter at least one of the first, the second the third frequency bands.

The radio frequency circuit can further include an impedance matching circuit connected to the circuit and configured to adjust impedance of a path between the first power amplifier and the second power amplifier and the low noise amplifier and the plurality of filters. An output port of the low noise amplifier can be in communication with a signal splitter.

Another aspect of this disclosure is a front-end module comprising a circuit assembly including a first power amplifier configured to amplify signals of a first frequency band, a second power amplifier configured to amplify signals at least one of a second frequency band and a third frequency band, where the first frequency band is disposed between the second and the third frequency bands, a low noise amplifier configured to amplify signals of the first, the second and the third frequency bands, and a first plurality of switches configured to route signals through at least one of the first and the second power amplifiers and the low noise amplifier; and a plurality of filters connected to the circuit assembly, where each filter is configured to filter at least one of the first, the second and the third frequency bands.

The first frequency band can be a wireless local area network band and the second and the third frequency bands are cellular bands. The second power amplifier can be further configured amplify signals of a fourth frequency band.

The front-end module can further include an impedance matching circuit in communication with the circuit assembly and can be configured to adjust impedance of a path between the plurality of filters and the circuit assembly. The front-end module can further include a switching circuit configured to route the signals through at least one of the plurality of filters based on the control signal.

Another aspect of this disclosure is a wireless device comprising one or more antennas configured to receive and transmit radio frequency signals; a circuit including a first power amplifier configured to amplify signals of a first frequency band, a second power amplifier configured to amplify signals at least one of a second frequency band and a third frequency band, where the first frequency band is disposed between the second and the third frequency bands, a low noise amplifier configured to amplify signals of the first, the second and the third frequency bands, and a first plurality of switches configured to route signals through at least one of the first power amplifier, the second power amplifiers and the low noise amplifier; and a transceiver coupled to the circuit and configured to receive and transmit to the signals to the circuit.

The wireless device can further include a switching circuit that includes a first filter configured to filter the first frequency band, a second filter configured to filter the second frequency band, a third filter configured to filter the third frequency band, and a plurality of switches configured to route the signals from the one or more antenna through at least one of the first filter, the second filter, and the third filter.

The wireless device can further include an impedance matching circuit coupled to the circuit and can be configured to adjust impedance of a path between the first, the second and the third power amplifiers and the plurality of filters. The first frequency band can be a wireless local area network band and the second and the third frequency bands can be cellular bands.

The wireless device can further include a switching circuit that includes a first filter configured to filter the first frequency band and the second frequency band, a second filter configured to filter the first frequency band and the third frequency band, a third filter configured to filter the second frequency band, a fourth filter configured to filter the third frequency band and a second plurality of switches configured to route the signals from the one or more antennas through the first and the fourth filters or through the second and the third filters.

The wireless device can further include an impedance matching circuit connected to the circuit and configured to adjust impedance of a path between the first, the second and the third power amplifiers and the plurality of filters. The impedance matching circuit can include a switch circuit and at least one of a capacitor, an inductor and a resister. The wireless device can further include a controller configured to send control signals to the switching circuit to select paths between the one or more antennas and the plurality of filters. The wireless device can further include a signal splitter connected to an output of the low noise amplifier and the signal splitter can include output ports connected to the transceiver.

For purposes of summarizing the disclosure, certain aspects, advantages and novel features of the innovations have been described herein. It is to be understood that not necessarily all such advantages may be achieved in accordance with any particular embodiment. Thus, the innovations may be embodied or carried out in a manner that achieves or optimizes one advantage or group of advantages as taught herein without necessarily achieving other advantages as may be taught or suggested herein.

BRIEF DESCRIPTION OF THE DRAWINGS

Embodiments of this disclosure will now be described, by way of non-limiting example, with reference to the accompanying drawings.

DETAILED DESCRIPTION

Figure 1:
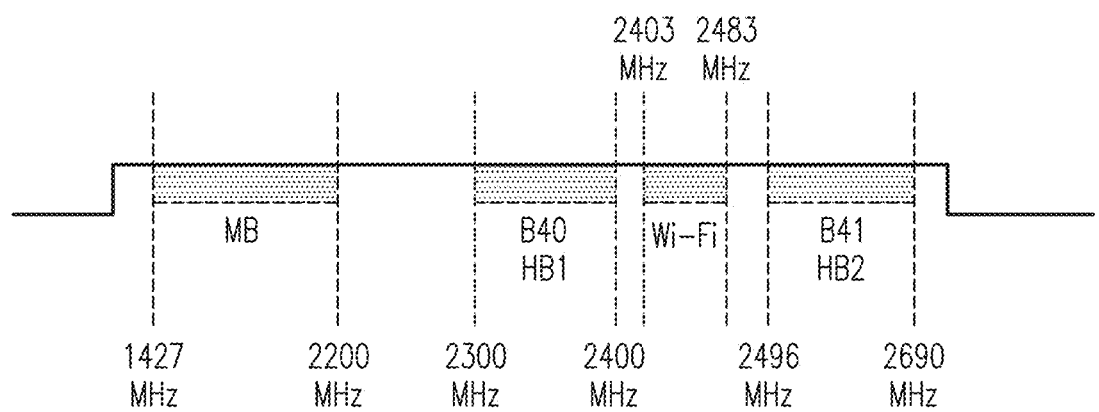
FIG. 1 illustrates an example of frequency bands that can be utilized in wireless communications, according to certain embodiments.

The following description of certain embodiments presents various descriptions of specific embodiments. However, the innovations described herein can be embodied in a multitude of different ways, for example, as defined and covered by the claims. In this description, reference is made to the drawings where like reference numerals can indicate identical or functionally similar elements. It will be understood that elements illustrated in the figures are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

FIG. 1 illustrates an example of frequency bands that can be utilized in wireless communications, according to certain embodiments. Typically, wireless communication frequencies can be divided into a low frequency band (e.g., approximately 698 MHz-approximately 960 MHz, LB), a middle frequency band (e.g., approximately 1427 MHz-approximately 2200 MHz, MB), a high frequency band (e.g., approximately 2300 MHz-approximately 2690 MHz, HB) and ultrahigh frequency band (e.g., approximately 3400 MHz-approximately 3600 MHz, UHB).

The high frequency band includes, but is not limited to, band 40 (B40), band 30 (B30), band 41 (B41) and band 7 (B7), etc. B41 is used in time division duplex (TDD) and thus has a single frequency band of approximately 2496 MHz to approximately 2690 MHz, which is utilized for both transmitted (Tx) and received (Rx) operations. Similarly, B40 is used in TDD and thus has a single frequency band of approximately 2300 MHz to approximately 2400 MHz. B41 and B40 can be utilized in cellular communications, e.g., 3rd generation partnership project (3GPP) wireless device. B7 is used in frequency division duplex (FDD) and thus performs simultaneous Tx and Rx operations via different frequencies, for example, Tx (approximately 2500 MHz to approximately 2570 MHz) and Rx (approximately 2620 MHz to approximately 2690 MHz) paths. This is typically accomplished by the use of a duplexer, which combines the Tx and Rx paths into a common terminal. B30 is also used in FDD and thus performs simultaneous Tx and Rx operations via different frequencies, for example, Tx (approximately 2305 MHz to approximately 2315 MHz) and Rx (approximately 2350 MHz to approximately 2360 MHz) paths. For illustration purposes, the frequency range of approximately 2300 MHz-approximately 2400 MHz is illustrated as HB1 and the frequency range of approximately 2496 MHz-approximately 2690 MHz is illustrated as HB2 in FIG. 1.

The middle frequency band includes, but is not limited to, band 51 (B51) (e.g., approximately 1427 MHz-approximately 1432 MHz, TDD), band 74 (B74) (e.g., approximately 1427 MHz-approximately 1432 MHz and approximately 1475 MHz-approximately 1518 MHz, FDD), band 65 (B65) (e.g., approximately 1920 MHz-approximately 2010 MHz and approximately 2110 MHz-approximately 2200 MHz, FDD) etc. The 2.4 GHz Wi-Fi band has a frequency range of approximately 2403 MHz to approximately 2483 (or approximately 2483.5) MHz, which lies between B40 and B41 and can be utilized in wireless local area network (WLAN). As illustrated in FIG. 1, a gap between the MB and the HB1 is approximately 100 MHz. However, a gap between a lower channel of Wi-Fi and an upper channel of B40 is approximately 3 MHz. A gap between an upper channel of Wi-Fi and a lower channel of B41 is approximately 13 MHz. A gap between an upper channel of Wi-Fi and a lower channel of B7 is approximately 17 MHz. These small gaps between two adjacent bands typically result in high insertion loss and frequency roll-off at the edges of adjacent bands.

Shared use of antennas is often facilitated in existing radio architectures through the use of "antenna plexers", which include banks of filters that enable a filtered merge of many signals in different frequency ranges to a single common antenna feed for a broadband antenna supporting all those bands. These are implemented in a variety of filter technologies, such as low temperature co-fired ceramic technology (LTCC), integrated passive device technology (IPD), discrete surface-mount technology (SMT), or a combination of those for purely L-C-based filters. Some cases, the requirement for the skirts of the filtering and close-in attenuations are much more difficult, i.e., acoustic filtering. The L-C and acoustic filtering techniques may also be mixed, and often the technology may be chosen to meet a difficult isolation specification or to achieve better insertion loss, or both. As the filter band groups of these ganged band pass filters get closer together in frequency offset, the corner frequency roll-off of the band pass filters, which designed in-band from out of band (OOB), starts to have more impact in increasing in-band insertion loss at those band edges, and the loading loss of filters becomes worse as well as these band pass filters move closer together in frequency. The implementation of the combination of Wi-Fi and cellular bands can be quite difficult on shared antenna systems that support both radio access technologies (RATs) because the frequency gap between these bands becomes quite small, as described above. As in the case of the HB group, which includes bands both above (B7/B41) and below (B30/B40), the 2.4 GHz Wi-Fi is in extremely close proximity. Emissions and isolation between these bands for these RATs is a large challenge for attenuation, isolation, emissions and insertion loss.

Previous solutions gang band pass filters in antenna plexers to facilitate isolation and merge of the various bands on to the common single antenna feed. This design is challenging because of the insertion loss and loading loss of the ganged filters, and depends on the technology, passive resonator Q, and design for corner frequency placement and performance requirements. The further challenge comes for the HB group which includes B40/B30 immediately below the 2.4 GHz Wi-Fi band, and B7/B41 immediately above the 2.4 GHz Wi-Fi band. The HB incoming trace then requires an "extractor" design which passes B41 and B40 while blocking the 2.4 GHz Wi-Fi, and the Wi-Fi must do the opposite. All of these corner frequencies in close proximity force higher band edge insertion loss and loading losses.

The combination of paths can be selected based at least in part on the specific channels of each RAT. Embodiments may utilize baseband coordination or concurrent decoding of separate control logic for the module. Embodiments disclosed herein provide switching module architectures that provide improved front end module performance, size, and reduced antenna count.

Figure 2:
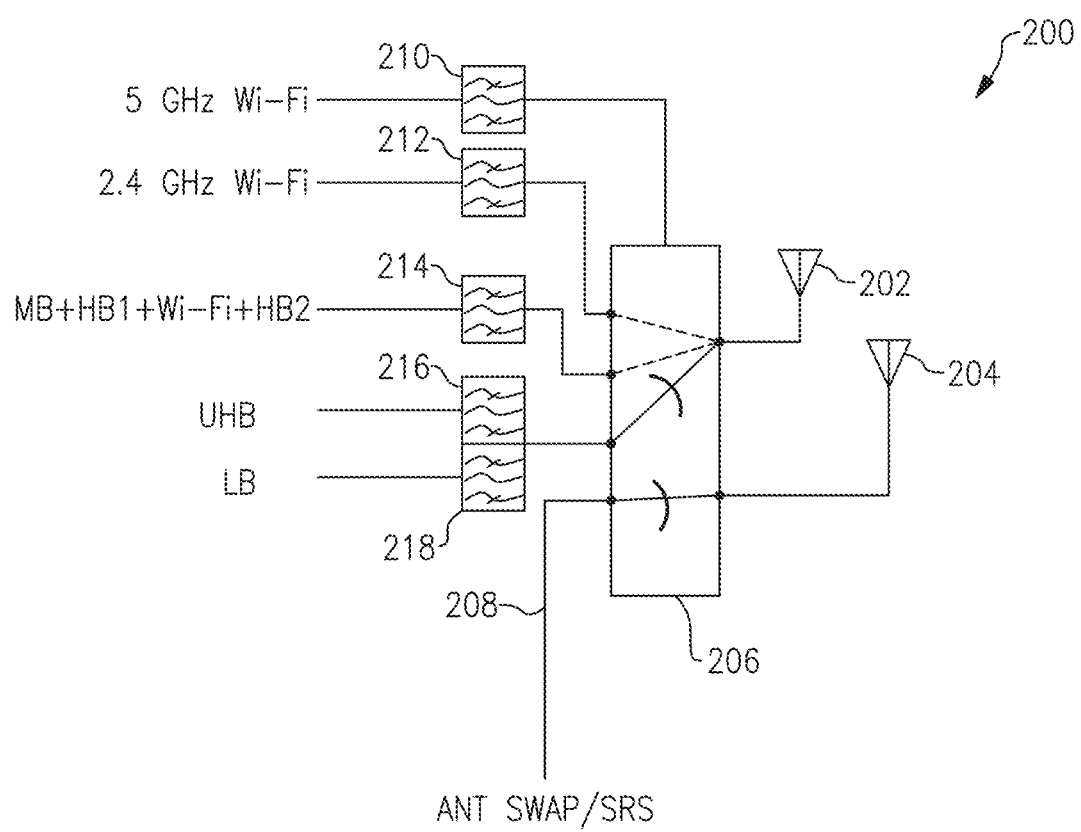
FIG. 2 is a schematic diagram of an embodiment of a switching circuit configured to route a signal through certain combination of switches.

FIG. 2 is a schematic diagram of an embodiment of a switching circuit 200 configured to route a signal through certain combinations of switches. The switching circuit 200 can be implemented in, but not limited to, a front end module, a front end configuration, a diversity receiver module, a multiple input multiple output (MiMo) module, etc. The switching circuit 200 can be configured to provide reconfigurable network selection using an antenna switch 206. For example, the switching circuit 200 can be configured to select one or more radio access networks for processing by forming selected paths through the antenna switch 206 and directing signals to designated filters associated with a desired or targeted radio access network.

In the illustrated embodiment, the switching circuit 200 comprises the antenna switch 206, such as, but not limited to an antenna switching module (ASM), filters 210, 212, 214, 216, 218 and control signal 208. The switching circuit 200 transmits an RF transmit signal to antennas 202, 204, receives an RF receive signal from the antennas 202, 204, and routes the RF receive signal through the appropriate filter to receiver circuitry for subsequent downconversion and baseband processing. The RF receive signal may be received as an FDD signal and/or a TDD signal, and have specific frequency band configuration. For example, the signals include single-band signals including data modulated onto single frequency bands, multi-band signals (also referred to as inter-band carrier aggregation signals) including data modulated onto multiple frequency bands and/or data modulated onto multiple frequency bands using different communication protocols.

In the illustrated embodiment, the antenna switch 206 is configured to receive an antenna swapping signal through the control signal 208 from a baseband subsystem that includes a processor and/or is based at least in part on the frequency band configuration. The antenna switch 206 is configured to connect the appropriate antenna(s) 202, 204 with one or more filters 210, 212, 214, 216, 218 based on the antenna swapping signal. Further, a sounding reference signal (SRS) is transmitted to a base station through at least one of the antennas 202, 204. The base station may use the SRS for uplink frequency selective scheduling, such as SRS hopping supporting to be able to direct transmit signals to appropriate antennas 202, 204. The antenna switch 206 can be a single-pole/multiple-throw (SPMT) switch, multi-pole/multi-throw (MPMT) switch or a signal splitter that routes the signal to at least one of the plurality of paths corresponding to the frequency band of the single-band signal or the multi-band signal. The connection paths of the antenna switch 206 illustrated in FIG. 2 are for illustrative purposes only.

The switching circuit 200 utilizes a filter 210 for filtering the 5 GHz Wi-Fi band signals transmitted to and received from at least one of the antennas 202, 204. The RF signals can include at least one of TDD and/or FDD signal. Similarly, the switching circuit 200 utilizes a filter 212 for filtering the 2.4 GHz Wi-Fi band signals transmitted to and received from at least one of the antennas 202, 204. The switching circuit 200 utilizes a filter 214 for filtering MB/HB signals transmitted to and received from at least one of the antennas 202, 204. In an embodiment, the MB/HB comprises a frequency range of approximately 1427 MHz-approximately 2690 MHz. The switching circuit 200 utilizes a filter 216 for filtering UHB signals transmitted to and received from at least one of the antennas 202, 204. The switching circuit 200 utilizes a filter 218 for filtering LB signals transmitted to and received from at least one of the antennas 202, 204. In an embodiment, the filters 216, 218 can be ganged together. In an embodiment, the filters 210, 212, 214, 216 can comprise band pass filter(s). The filter 218 can comprise a low pass filter. The filters 210, 212, 214, 216, 218 can comprise surface acoustic wave (SAW) filters and/or bulk acoustic wave (BAW) filters. SAW and/or BAW devices utilize the piezoelectric effect to convert energy back and forth between the electrical and mechanical realms where the presence of an electrical field causes the material to deform and the application of a mechanical stress induces an electric charge.

In an embodiment, user equipment (UE) including the antenna switch 206 can be configured not to support simultaneous or concurrent operation of the filter 214 and the filter 212. For example, the antenna switch 206 can be reconfigured to avoid the simultaneous or concurrent transmission in the 2.4 GHz Wi-Fi band and the MB/HB, which requires concurrent operation of both the filter 214 and the filter 212, by blanking coordination of RAT in the converged baseband modem internal to the UE or adjusting the network/access point coordination. In another embodiment, the antenna switch 206 can be configured not to connect one of the antennas 202, 204 to both the filter 214 and the filter 212. For example, when signals from one of the antennas 202, 204 are directed to both the filter 212 for the 2.4 GHz Wi-Fi band signals and the filter 214 for the MB/HB signals, the antenna switch 206 can be controlled to redirect the signals from the one of the antennas 202, 204 to the filter 210 for filtering the 5 GHz Wi-Fi band signals and the filter 214 for filtering the MB/HB signals. One of the filters 212, 214 can be selectively switched in to combine with the filters 216, 218. Accordingly, without an "extractor" filter that removes 2.4 GHz Wi-Fi frequency band from a frequency range of approximately 1427 MHz-approximately 2690 MHz, the switching circuit 200 can achieve lower insertion loss and low cost TDD coexistence.

Figure 3:
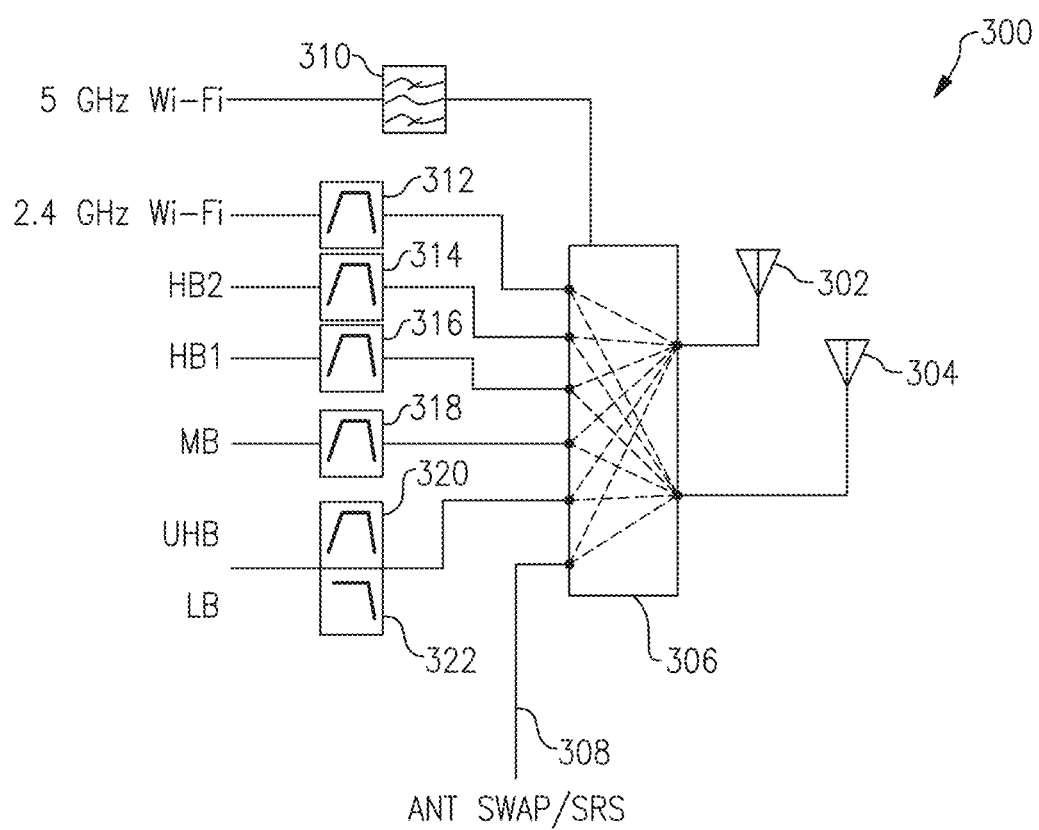
FIG. 3 is a schematic diagram of an embodiment of a switching circuit configured to route a signal through certain combination of switches.

FIG. 3 is a schematic diagram of an embodiment of a switching circuit 300 configured to route a signal through certain combinations of switches. The switching circuit 300 can be configured to provide reconfigurable network selection using an antenna switch 306. For example, the switching circuit 300 can be configured to select one or more radio access networks for processing by forming selected paths through the antenna switch 306 and directing signals to designated filters associated with a desired or targeted radio access network.

The switching circuit 300 is similar to the switching circuit 200 described herein with reference to FIG. 2. In the illustrated embodiment, the switching circuit 300 comprises the antenna switch 306, such as, but not limited to an antenna switching module (ASM), filters 310, 312, 314, 316, 318, 320, 322, and a control signal 308. The switching circuit 300 transmits an RF transmit signal to antennas 302, 304, receives an RF receive signal from the antennas 302, 304, and routes the RF receive signal through the appropriate filter to receiver circuitry for subsequent downconversion and baseband processing. The RF receive signal may be received as an FDD signal and/or a TDD signal and have specific frequency band configuration. For example, the signals include single-band signals including data modulated onto single frequency bands, multi-band signals (also referred to as inter-band carrier aggregation signals) including data modulated onto multiple frequency bands and/or data modulated onto multiple frequency bands using different communication protocols. The switching circuit 300 can utilize a filter 310 for filtering the 5 GHz Wi-Fi band signals transmitted to and received from at least one of the antennas 302, 304. The RF signals can include at least one of TDD signals and FDD signals. Similarly, the switching circuit 300 can utilize a filter 312 for filtering the 2.4 GHz Wi-Fi band signals transmitted to and received from at least one of the antennas 302, 304. Compared to the switching circuit 200, the switching circuit 300 comprises the filter 314 for filtering the HB2 signals, e.g., a frequency range of approximately 2496 MHz-approximately 2690 MHz, the filter 316 for filtering the HB1 signals, e.g., a frequency range of approximately 2300 MHz-approximately 2400 MHz, and a filter 318 for filtering the MB signals, e.g., approximately 1427 MHz-approximately 2200 MHz, instead of the filter 214 in FIG. 2 for filtering the MB/HB signals, e.g., a frequency range of approximately 1427 MHz-approximately 2690 MHz. The switching circuit 300 can utilize a filter 320 for filtering UHB signals transmitted to and received from at least one of the antennas 302, 304. The switching circuit 300 can utilize a filter 322 for filtering LB signals transmitted to and received from at least one of the antennas 302, 304. In an embodiment, the filters 320, 322 can be ganged together. In an embodiment, the filters 310, 312, 314, 316, 318, 320 can comprise band pass filter(s). The filter 322 can comprise a low pass filter. The filters 310, 312, 314, 316, 318, 320, 322 can comprise surface acoustic wave (SAW) filters and/or bulk acoustic wave (BAW) filters.

The filters 310, 312, 314, 316, 318, 320, 322 can be switch-combined as needed with a relatively smaller loss penalty in cases of coexistence of signals of the 2.4 GHz Wi-Fi band and cellular band. For example, the antenna switch 306 can be configured to route signals including both the 2.4 GHz Wi-Fi band signals and cellular band signals from one of the antennas 302, 304 to the suitable filters 312, 314, 318 instead of routing the signals to the filter 316 for filtering the HB1 signals to avoid concurrent use of the filter 312 for filtering the 2.4 GHz Wi-Fi band signals and the filter 316 for filtering the HB1 signals because a gap band between the 2.4 GHz Wi-Fi band and the HB2, which is approximately 13 MHz, is larger than a gap band between the 2.4 GHz Wi-Fi band and the HB1, which is approximately 3 MHz. When the coexistence of signals of the 2.4 GHz Wi-Fi band and cellular band is not required, the at least one suitable filter of the filters 310, 312, 314, 316, 318, 320, 322 can be selected.

The antenna switch 306 is can be configured to receive an antenna swapping signal through the control signal 308 from a baseband subsystem that includes a processor and/or is based at least in part on the frequency band configuration. Further, a sounding reference signal (SRS) is transmitted to a base station through at least one of the antennas 302, 304. The antenna switch 306 can be a single-pole/multiple-throw (SPMT) switch, multi-pole/multi-throw (MPMT) switch or a signal splitter that routes the signal to at least one of the plurality of paths corresponding to the frequency band of the single-band signal or the multi-band signal. The connection paths of the antenna switch 306 illustrated in FIG. 3 are for illustrative purposes only.

Figure 4:
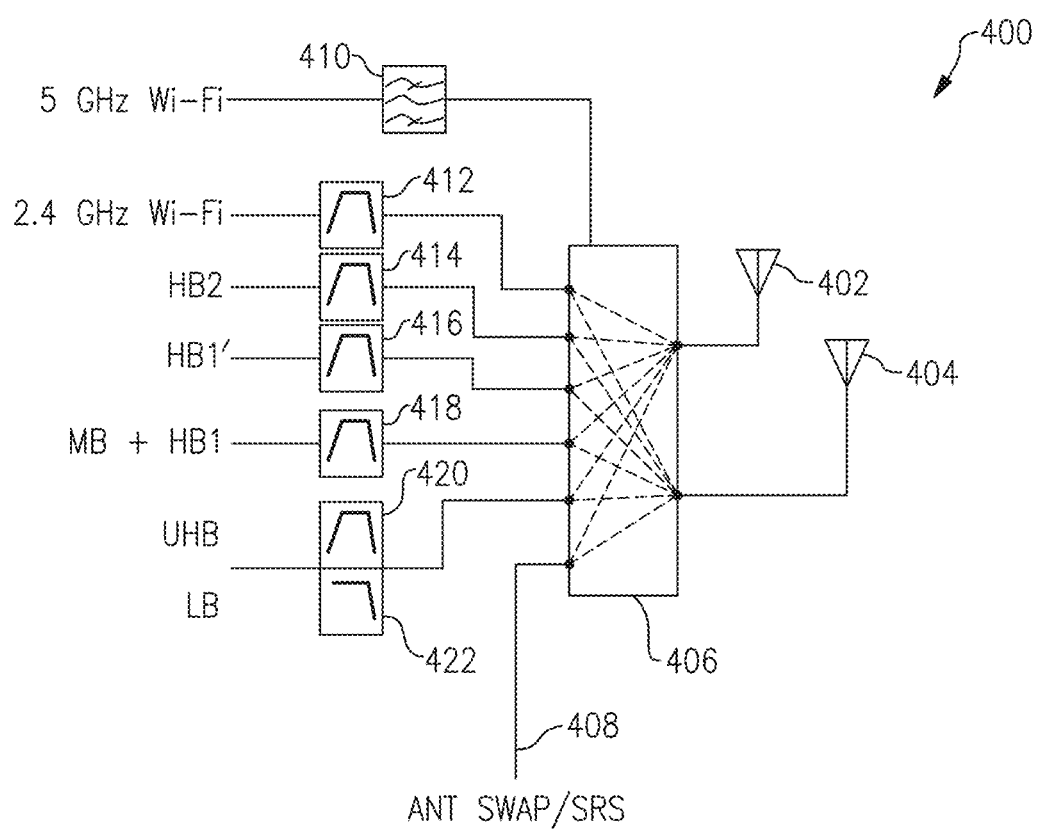
FIG. 4 is a schematic diagram of an embodiment of a switching circuit configured to route a signal through certain combination of switches.

FIG. 4 is a schematic diagram of an embodiment of a switching circuit 400 configured to route a signal through certain combinations of switches. The switching circuit 400 is similar to the switching circuit 300 described herein with reference to FIG. 3. In the illustrated embodiment, the switching circuit 400 comprises the antenna switch 406, such as, but not limited to an antenna switching module (ASM), filters 410, 412, 414, 416, 418, 420, 422, and a control signal 408. The switching circuit 400 transmits an RF transmit signal to antennas 402, 404, receives an RF receive signal from the antennas 402, 404, and routes the RF receive signal through the appropriate filter to receiver circuitry for subsequent downconversion and baseband processing. The RF receive signal may be received as an FDD signal and/or a TDD signal and have specific frequency band configuration. For example, the signals include single-band signals including data modulated onto single frequency bands, multi-band signals (also referred to as inter-band carrier aggregation signals) including data modulated onto multiple frequency bands and/or data modulated onto multiple frequency bands using different communication protocols.

The switching circuit 400 utilizes a filter 410 for filtering the 5 GHz Wi-Fi band signals transmitted to and received from at least one of the antennas 402, 404. Similarly, the switching circuit 400 utilizes a filter 412 for filtering the 2.4 GHz Wi-Fi band signal transmitted to and received from at least one of the antennas 402, 404. Compared to the switching circuit 300, the switching circuit 400 can comprise the filter 416 for filtering HB1' signals, e.g., a frequency range of approximately 2300 MHz-approximately 2370 MHz and a filter 418 for filtering the MB/HB1 signals, e.g., approximately 1427 MHz-approximately 2400 MHz, instead of the filter 316 for filtering the HB1 signals, e.g., a frequency range of approximately 2300 MHz-approximately 2400 MHz and the filter 318 for filtering the MB signals, e.g., a frequency range of approximately 1427 MHz-approximately 2200 MHz. Alternatively, the filter 418 can be configured to filter the MB/HB1' band signals, e.g., approximately 1427 MHz-approximately 2370 MHz. The switching circuit 400 can utilize a filter 420 for filtering UHB signals transmitted to and received from at least one of the antennas 402, 404. The switching circuit 300 can utilize a filter 422 for filtering LB signals transmitted to and received from at least one of the antennas 402, 404. In an embodiment, the filters 420, 422 can be ganged together. In an embodiment, the filters 410, 412, 414, 416, 418, 420 can comprise band pass filter(s). The filter 422 can comprise a low pass filter. The filters 410, 412, 414, 416, 418, 420, 422 can comprise surface acoustic wave (SAW) filters and/or bulk acoustic wave (BAW) filters.

The filter 416 for filtering the HB1' signals can be selected in cases of the coexistence of signals of the 2.4 GHz Wi-Fi band and cellular band in order to facilitate ganging or switch-combining because a gap band between the 2.4 GHz Wi-Fi band and the HB1' is approximately 33 MHz, which is larger than a gap band between the 2.4 GHz Wi-Fi band and the HB1. For example, the antenna switch 406 can be configured to route signals including the 2.4 GHz Wi-Fi band signals and cellular band signals from one of the antennas 402, 404 to the filter 412 for filtering the 2.4 GHz Wi-Fi band signals, and the filter 416 for filtering the HB1' signals. Alternatively, when the coexistence of signals of the 2.4 GHz Wi-Fi band and cellular band is required, the filter 418 for filtering the MB/HB1' signals, e.g., approximately 1427 MHz-approximately 2370 MHz and the filter 412 for filtering the 2.4 GHz Wi-Fi band signals can be selected. In another embodiment, the switching circuit 400 can further comprise a filter for filtering the HB1 signals, e.g., approximately 2300 MHz-approximately 2400 MHz, when the coexistence of signals of the 2.4 GHz Wi-Fi band and cellular band is not utilized.

The antenna switch 406 can be is configured to receive an antenna swapping signal through the control signals 408 from a baseband subsystem that includes a processor and/or is based at least in part on the frequency band configuration. Further, a sounding reference signal (SRS) can be transmitted to a base station through at least one of the antennas 402, 404. The antenna switch 406 can be a single-pole/multiple-throw (SPMT) switch, multi-pole/multi-throw (MPMT) switch or a signal splitter that routes the signal to at least one of the plurality of paths corresponding to the frequency band of the single-band signal or the multi-band signal. The connection paths of the antenna switch 406 illustrated in FIG. 4 are for illustrative purposes only.

Figure 5:
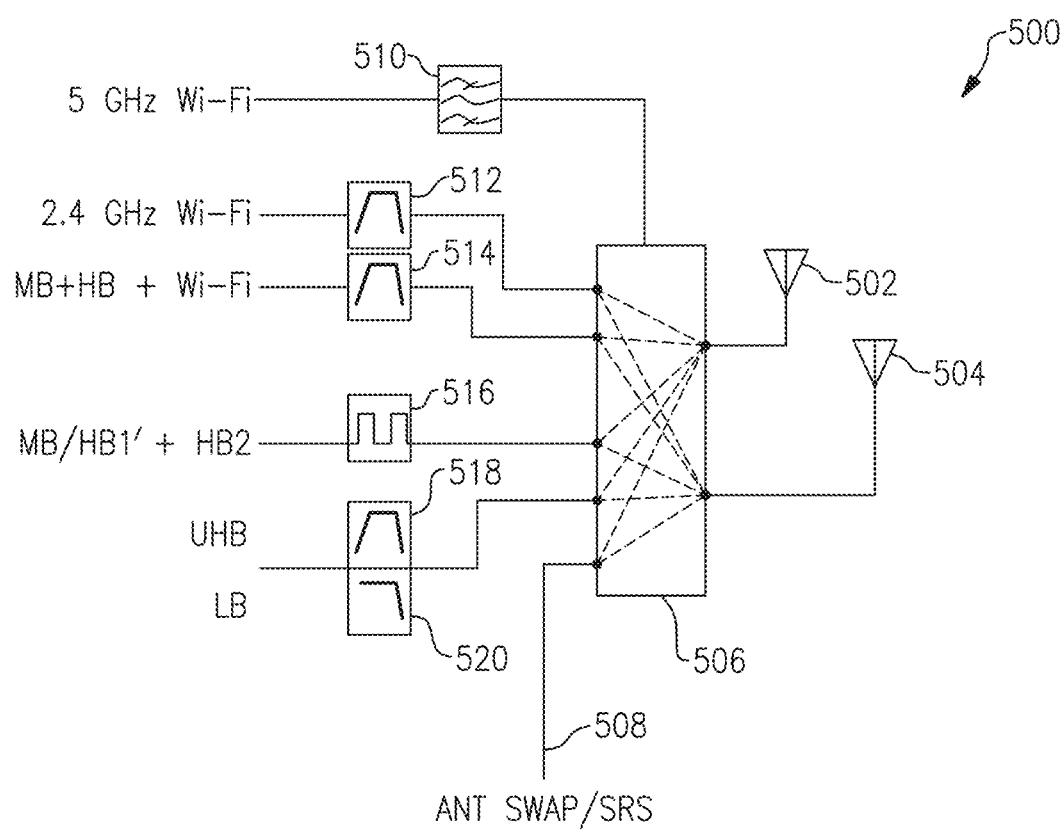
FIG. 5 is a schematic diagram of an embodiment of a switching circuit configured to route a signal through certain combination of switches.

FIG. 5 is a schematic diagram of an embodiment of a switching circuit 500 configured to route a signal through certain combinations of switches. The switching circuit 500 is similar to the switching circuit 200 described herein with reference to FIG. 2 except that the switching circuit 500 further comprises a filter for filtering the MB/HB1' and the HB2, e.g., approximately 1427 MHz-approximately 2370 MHz and approximately 2496 MHz-approximately 2690 MHz, and passing the 2.4 GHz Wi-Fi band signals. In the illustrated embodiment, the switching circuit 500 comprises the antenna switch 506, such as, but not limited to an antenna switching module (ASM), filters 510, 512, 514, 516, 518, 520, and a control signal 508. The switching circuit 500 transmits an RF transmit signal to antennas 502, 504, receives an RF receive signal from the antennas 502, 504, and routes the RF receive signal through the appropriate filter to receiver circuitry for subsequent downconversion and baseband processing. The RF receive signal may be received as an FDD signal and/or a TDD signal and have specific frequency band configuration. For example, the signals can include single-band signals including data modulated onto single frequency bands, multi-band signals (also referred to as inter-band carrier aggregation signals) including data modulated onto multiple frequency bands and/or data modulated onto multiple frequency bands using different communication protocols.

The switching circuit 500 can utilize a filter 510 for filtering the 5 GHz Wi-Fi signals transmitted to and received from at least one of the antennas 502, 504. Similarly, the switching circuit 500 can utilize a filter 512 for filtering the 2.4 GHz Wi-Fi band signals transmitted to and received from at least one of the antennas 502, 504. The filter 514 can be configured to filter MB/HB/Wi-Fi band signals, e.g., approximately 1427 MHz-approximately 2690 MHz. The filter 516 can be configured to filter the MB/HB1' and the HB2, e.g., approximately 1427 MHz-approximately 2370 MHz and approximately 2496 MHz-approximately 2690 MHz and pass the 2.4 GHz Wi-Fi band signals. The switching circuit 500 can utilize a filter 518 for filtering UHB signals transmitted to and received from at least one of the antennas 502, 504. The switching circuit 500 can utilize a filter 520 for filtering LB signals transmitted to and received from at least one of the antennas 502, 504. In an embodiment, the filters 518, 520 can be ganged together. In an embodiment, the filters 510, 512, 514, 518 can comprise band pass filter(s). The filter 516 can comprise two separate band pass filters which are separated by a region of attenuation in-between. The filter 520 can comprise a low pass filter. The filters 510, 512, 514, 516, 518, 520 can comprise surface acoustic wave (SAW) filters and/or bulk acoustic wave (BAW) filters.

The antenna switch 506 can be configured to select the shared paths or individual paths between the antenna 502, 504 and the filters 510, 512, 514, 516, 518, 520 depending on the coexistence and concurrency requirements of the 2.4 GHz Wi-Fi band and cellular band. For example, the filter 516 for filtering approximately 1427 MHz-approximately 2370 MHz and approximately 2496 MHz-approximately 2690 MHz is selected in cases where the coexistence of signals of the 2.4 GHz Wi-Fi band and cellular band is required in order to facilitate ganging or switch-combining with the filter 512 for filtering the 2.4 GHz Wi-Fi band signals. Particularly, even when the signals including both the 2.4 GHz Wi-Fi band signals and cellular band signals come from one of the antennas 502, 504 instead of the 2.4 GHz Wi-Fi band signals and cellular band signals coming from separate antennas, selecting paths through the filter 512 for filtering the 2.4 GHz Wi-Fi band signals and the filter 516 for filtering the MB/HB1' and the HB2 and passing the 2.4 GHz Wi-Fi band signals together can achieve low insertion loss without band edge roll-off. Alternatively, the filter 514 for filtering signals 1427 MHz-signals 2690 MHz can be selected without significant band edge roll-off at the frequencies of adjacency and without the associated higher insertion loss penalties when the coexistence of signals of the 2.4 GHz Wi-Fi band and cellular band is not required.

The antenna switch 506 can be configured to receive an antenna swapping signal through the control signal 508 from a baseband subsystem that includes a processor and/or is based at least in part on the frequency band configuration. Further, a sounding reference signal (SRS) can be transmitted to a base station through at least one of the antennas 502, 504. The antenna switch 506 can be a single-pole/multiple-throw (SPMT) switch, multi-pole/multi-throw (MPMT) switch or a signal splitter that routes the signal to at least one of the plurality of paths corresponding to the frequency band of the single-band signal or the multi-band signal. The connection paths of the antenna switch 506 illustrated in FIG. 5 are for illustrative purposes only.

Figure 10:
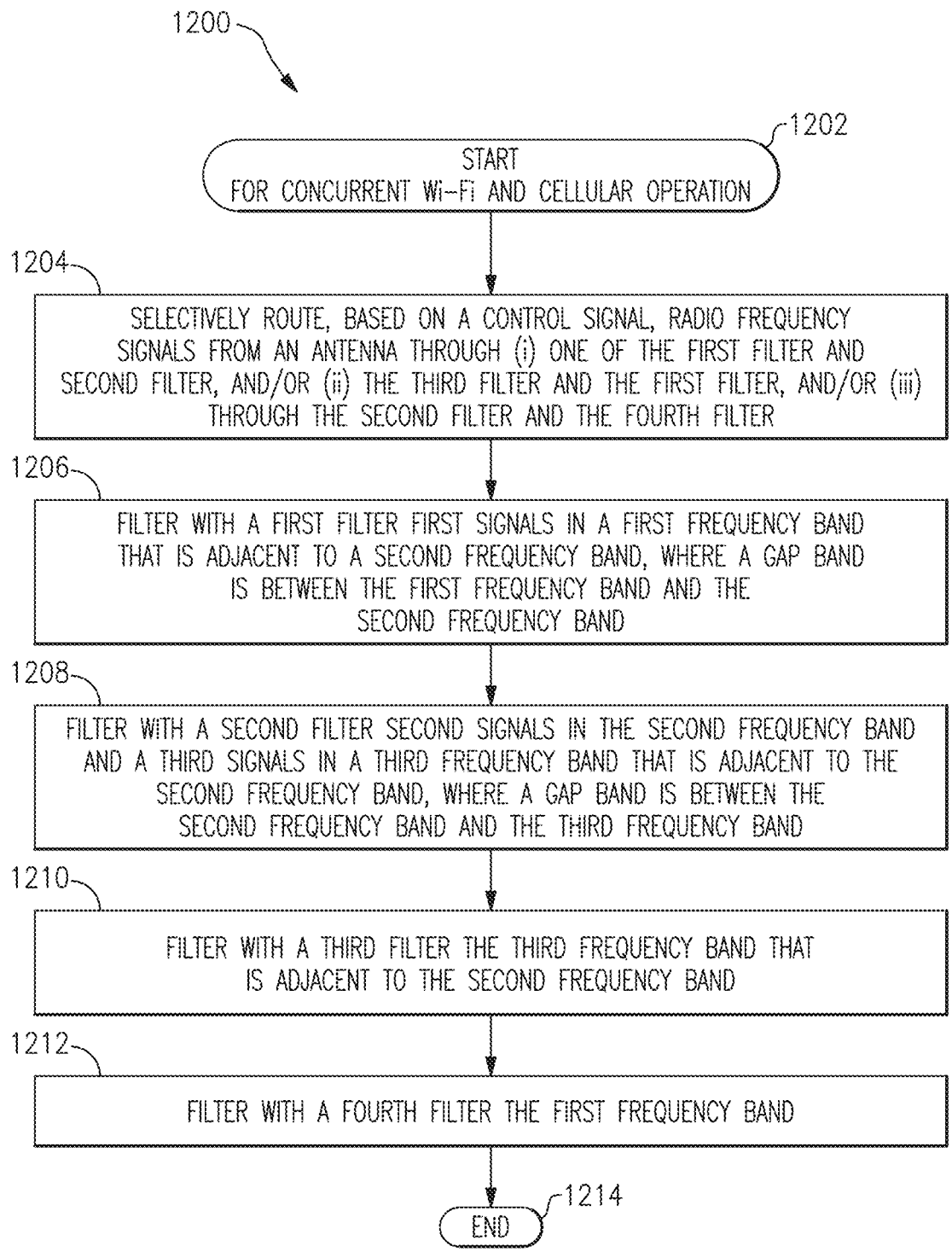
FIG. 10 is a flow chart of an exemplary process to route radio frequency signals on one or paths between one or more antennas and one or more filters for concurrent cellular and Wi-Fi operation.

FIG. 10 is a flow chart of an exemplary process 1200 to route radio frequency signals on one or paths between one or more antennas and one or more filters for concurrent cellular and Wi-Fi operation to provide improved front end module performance, size, and reduced antenna count. Referring to at least FIGS. 2-5 and FIG. 10, the process begins at START block 1202. At block 1204, the process 1200 can selectively route, based on a control signal, radio frequency signals from an antenna through (i) one of a first filter and a second filter, and/or (ii) a third filter and the first filter, and/or (iii) through the second filter and a fourth filter.

At block 1206, the process can filter with the first filter first signals in a first frequency band that is adjacent to a second frequency band, where a gap band is between the first frequency band and the second frequency band. At block 1208, the process 1200 can filter with a second filter second signals in the second frequency band and a third signals in a third frequency band that is adjacent to the second frequency band, where a gap band is between the second frequency band and the third frequency band.

At block 1210, the process can filter with a third filter the third frequency band that is adjacent to the second frequency band. And at block 1212, the process can filter with a fourth filter the first frequency band. The process 1200 ends at END block 1214.

Figure 6A:
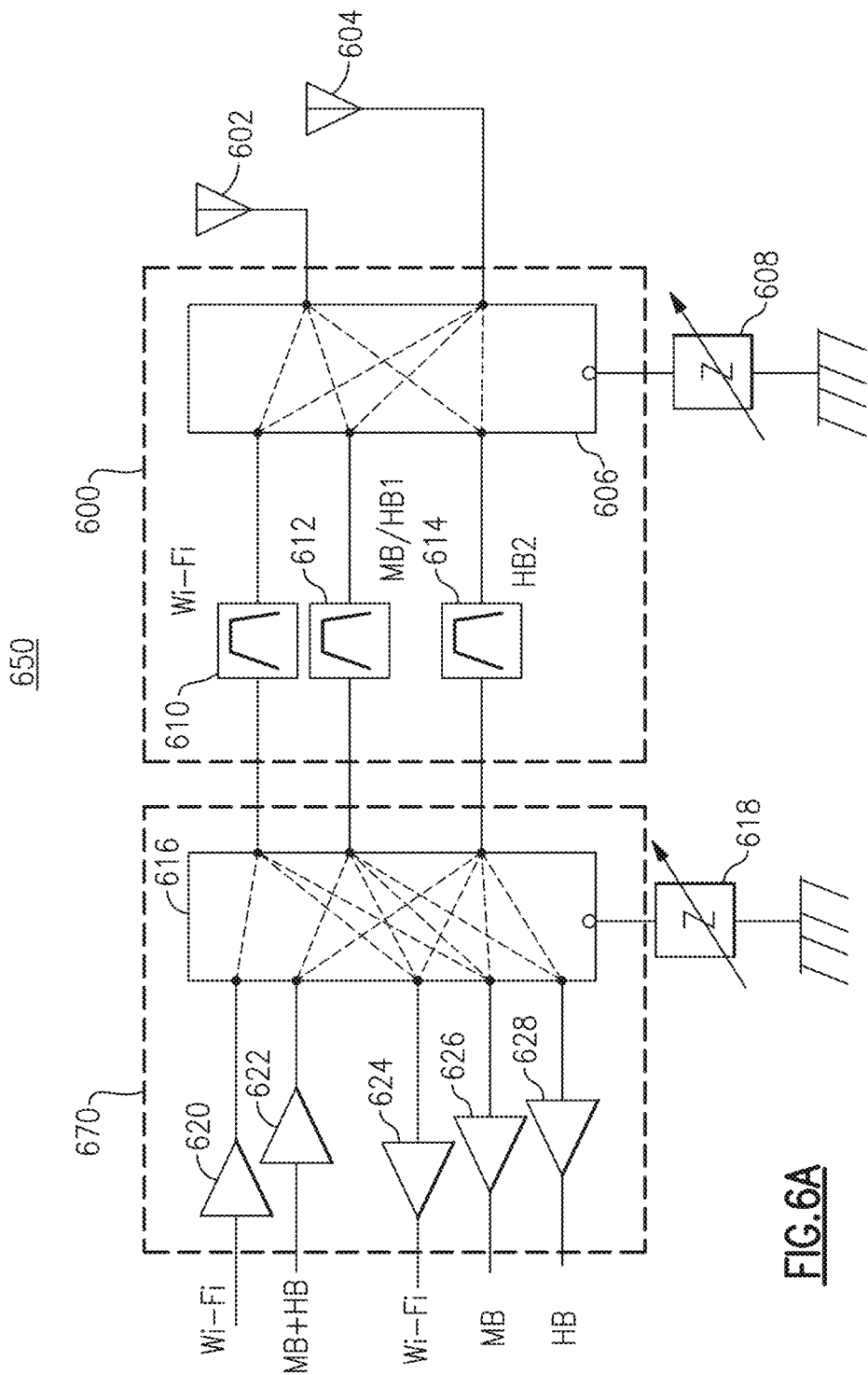
FIG. 6A is a schematic diagram of an embodiment of a switching circuit implemented in a front end configuration.

FIG. 6A illustrates an example of a switching circuit 600 implemented in a front end configuration 650. In an embodiment, the switching circuit 600 can be implemented in a front end module. The illustrated front end configuration 650 comprises the switching circuit 600 and an amplifier assembly 670. The front end configuration 650 can be configured to provide reconfigurable network selection using the switching circuit 600 and the amplifier assembly 670. For example, the front end configuration 650 can be configured to select one or more radio access networks for processing by forming selected paths through the switching circuit 600 and the amplifier assembly 670 and directing signals to designated filters and/or amplifiers associated with a desired or targeted radio access network.

The switching circuit 600 is similar to the switching circuit 200 described herein with reference to FIG. 2. In the illustrated embodiment, the switching circuit 600 comprises the antenna switch 606, such as, but not limited to an antenna switching module (ASM), and filters 610, 612, 614. The switching circuit 600 transmits an RF transmit signal to antennas 602, 604, receives an RF receive signal from the antennas 602, 604, and routes the RF receive signal through the appropriate filter to receiver circuitry for subsequent downconversion and baseband processing. The RF receive signal may be received as an FDD signal and/or a TDD signal and have specific frequency band configuration. For example, the signals include single-band signals including data modulated onto single frequency bands, multi-band signals (also referred to as inter-band carrier aggregation signals) including data modulated onto multiple frequency bands, and/or data modulated onto multiple frequency bands using different communication protocols. The switching circuit 600 can utilize a filter 610 for filtering the 2.4 GHz Wi-Fi band signals transmitted to and received from at least one of the antennas 602, 604. The filter 612 can be configured to filter the MB/HB1 band, e.g., approximately 1427 MHz-approximately 2400 MHz. Alternatively, the filter 612 can be configured to filter the MB/HB1' band, e.g., approximately 1427 MHz-approximately 2370 MHz. The filter 614 can be configured to filter the HB2, e.g., approximately 2496 MHz-approximately 2690 MHz. Filters for UHB and LB are not illustrated. In an embodiment, the filters 610, 612, 614 can comprise band pass filter(s). The filters 610, 612, 614 can comprise surface acoustic wave (SAW) filters and/or bulk acoustic wave (BAW) filters.

The antenna switch 606 can be configured to receive an antenna swapping signal through a control signal (not illustrated) from a baseband subsystem that includes a processor and/or is based at least in part on the frequency band configuration. Further, a sounding reference signal (SRS) is transmitted to a base station through at least one of the antennas 602, 604. The antenna switch 606 can be a single-pole/multiple-throw (SPMT) switch, multi-pole/multi-throw (MPMT) switch, or a signal splitter that routes the signal to at least one of the plurality of paths corresponding to the frequency band of the single-band signal or the multi-band signal. The connection paths of the antenna switch 606 illustrated in FIG. 6A are for illustrative purposes only.

The antenna switch 606 can be configured to route signals including the 2.4 GHz Wi-Fi band signals and cellular band signals from one of the antennas 602, 604 to the filter 610 for filtering the 2.4 GHz Wi-Fi band signals and to the filter 614 for filtering the HB2 signals. When one of the antennas 602, 604 receives signals including the 2.4 GHz Wi-Fi band and the other one of the antennas 602, 604 receives signals including the cellular band signals, the signals including the 2.4 GHz Wi-Fi band signals are routed to the filter 610 for filtering the 2.4 GHz Wi-Fi band signals and the signals including the cellular band signals are routed to one of the filter 612 for filtering the MB and the filter 614 for filtering the HB2. When the coexistence of signals of the 2.4 GHz Wi-Fi band and cellular band is not utilized, the filter 612 for filtering the MB/HB1, e.g., approximately 1427 MHz-approximately 2400 MHz can be selected and an adjacent band edge roll off of the cellular band can be prevented.

The amplifier assembly 670 provides amplification for signals that pass through the amplifier assembly 670. The amplifier assembly 670 provides amplification for a subset of the signal paths through the switching circuit 600. The amplifier assembly 670 can comprise amplifiers 620, 622, 624, 626, 628 and an amplifier assembly switch 616. In an embodiment, the amplifiers 620, 622, 624, 626, 628 can comprise a variable-gain amplifier, a fixed-gain amplifier, a variable-current amplifier and/or a fixed-current amplifier.

The amplifier assembly switch 616 is configured to receive a control signal from a baseband subsystem that includes a processor and/or is based at least in part on the frequency band configuration. The amplifier assembly switch 616 can be a single-pole/multiple-throw (SPMT) switch, multi-pole/multi-throw (MPMT) switch, or a signal splitter that routes the signal to at least one of the plurality of paths corresponding to the frequency band of the single-band signals or the multi-band signals. The connection paths of the amplifier assembly switch 616 illustrated in FIG. 6A are for illustrative purposes only.

The amplifiers 620, 622 can include power amplifiers. The amplifiers 620, 622 provide amplification for transmissions of the 2.4 GHz Wi-Fi signals and the cellular band signals, respectively. The amplifiers 624, 626, 628 can include low noise amplifiers. The amplifiers 624, 626, 628 provide amplification for signals from the filter 610, the filter 612, and the filter 614, respectively. The amplifier assembly switch 616 and the antenna switch 600 are correlated to reconfigure the switches to established suitable paths between the filters 610, 612, 614 and the amplifiers 620, 622, 624, 626, 628 as discussed below. The amplifiers 620 and 624 amplify the 2.4 GHz Wi-Fi signals. The amplifier 622 amplifies a frequency range of 1427 MHz-2690 MHz. The amplifiers 626, 628 amplify approximately 1427 MHz-approximately 2400 MHz and approximately 2496 MHz-approximately 2690 MHz except for the 2.4 GHz Wi-Fi signals, respectively. When signals transmitted to or received from one of the antennas 602, 604 pass through the filter 612, the amplifier assembly switch 616 can reconfigure the switches for the signals to pass through the amplifiers 622 and 626. When signals transmitted to or received from one of the antennas 602, 604 pass through the filter 614, the amplifier assembly switch 616 can reconfigure the switches for the signals to pass through the amplifiers 622 and 628.

The front end configuration 650 further comprises impedance matching circuits 608 and 618. The impedance matching circuits 608 and 618 can be connected to the antenna switch 600 and the amplifier assembly switch 616, respectively. The switch combination of the antenna switch 606 or the amplifier assembly switch 616, e.g., single path or multiple paths, may require changes in an impedance in order to match particular frequency ranges and filter impedance contour management challenges. The impedance matching circuits 608 and 618 are configured to provide targeted impedance for particular frequency band and particular frequency band combinations. The impedance matching circuits 608 and 618 are configured to be programmed to assume any suitable impedance depending on at least in part on selected signal paths or frequencies. In an embodiment, the impedance matching circuits 608 and 618 comprise a switchable impedance circuit including at least one of a capacitor, an inductor and a resister. The switchable impedance circuit can include a number of different enable switches, e.g., field effect transistors (FET), to provide different value of a reactance to obtain switch tenability by adjusting on/off of the enable switches. Alternatively, the switchable impedance circuit can include at least one of a variable capacitor and a variable inductor. The switchable impedance circuit can be connected to an end of the antennas 602, 604.

Figure 6B:
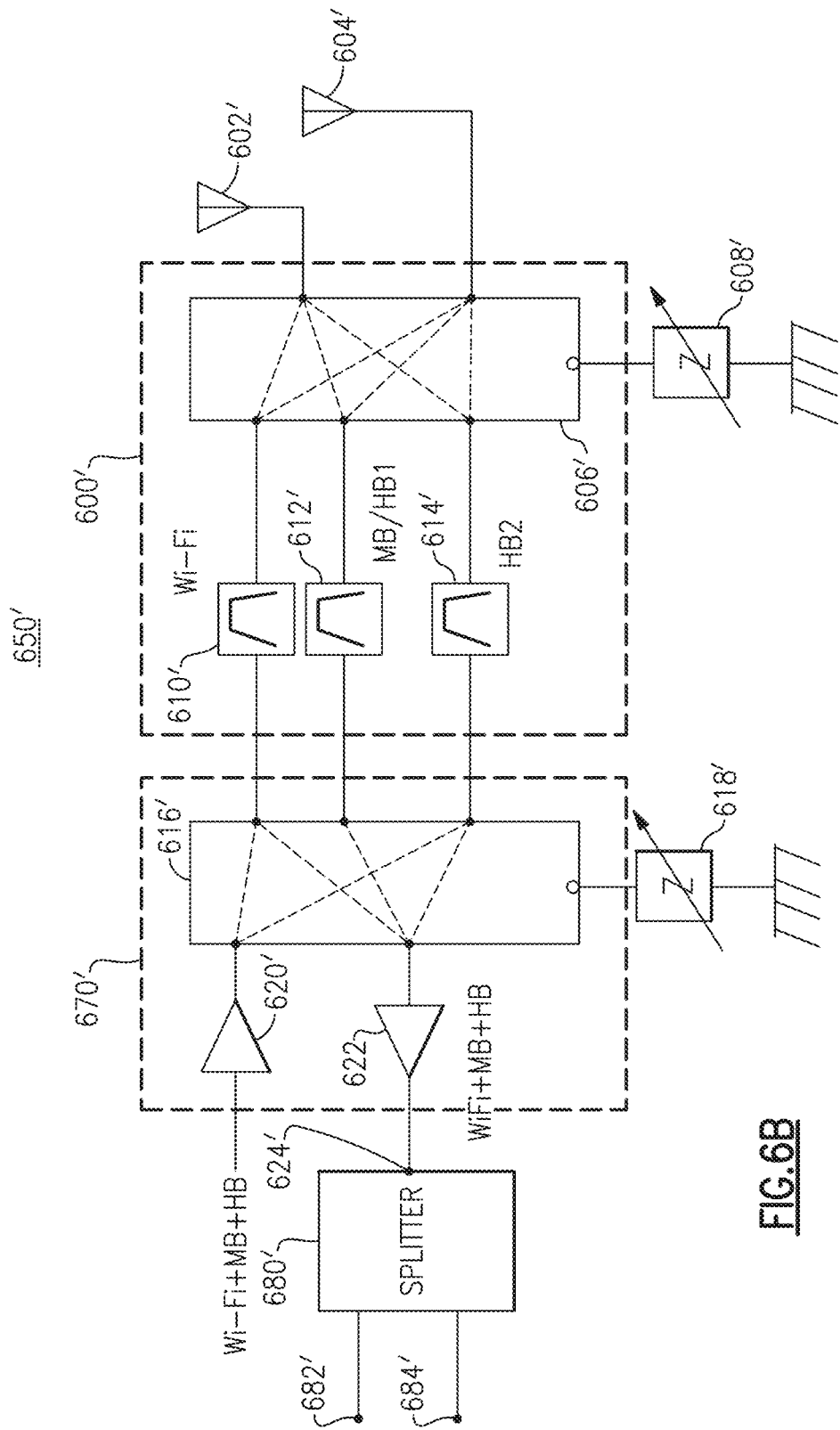
FIG. 6B is a schematic diagram of an embodiment of a switching circuit implemented in a front end configuration.

FIG. 6B is a schematic diagram of an embodiment of a switching circuit 600' implemented in a front end configuration 650'. In an embodiment, the switching circuit 600' can be implemented in a front end module. The front end configuration 650' comprises the switch circuit 600' and an amplifier assembly 670'. The front end configuration 650' is similar to the front end configuration 650 described herein with reference to FIG. 6A, except that the amplifier assembly 670' includes a converged power amplifier 620' and a converged low noise amplifier 622'. The converged power amplifier 620' provides amplification for transmissions of the 2.4 GHz Wi-Fi signals and the cellular band signals, e.g., 1427 MHz-2690 MHz. The converged low noise amplifier 622' provides amplification for signals from the filter 610', the filter 612' and the filter 614'. The front end configuration 650' further comprises impedance matching circuits 608' and 618'. The impedance matching circuits 608' and 618' are similar to the impedance matching circuits 608 and 618 illustrated in FIG. 6A. In an embodiment, the amplifier assembly 670' can comprise the amplifiers 620, 622 illustrated in FIG. 6A, instead of the converged power amplifier 620'. An output port 624' of the converged low noise amplifier 622' can be connected to a splitter 680. The splitter 680' can be configured to receive signals from the converged low noise amplifier 622' and route the signals from the converged low noise amplifier 622' to output ports 682', 684'. The output ports 682', 684' can be connected to separate transceiver ports (not illustrated), respectively. The splitter 680' can be controlled by control signals from a baseband subsystem that includes a processor.

FIG. 7A is a schematic diagram of an embodiment of a switching circuit 700 implemented in a front end configuration 750. In an embodiment, the switching circuit 700 can be implemented in a front end module. The front end configuration 750 comprises the front end configuration 750 and an amplifier assembly 770. The front end configuration can be configured to provide reconfigurable network selection using the switching circuit 700 and the amplifier assembly 770. For example, the front end configuration 750 can be configured to select one or more radio access networks for processing by forming selected paths through the switching circuit 700 and the amplifier assembly 770 and directing signals to designated filters and/or amplifiers associated with a desired or targeted radio access network.

The switching circuit 700 is similar to the switching circuit 600 described herein with reference to FIG. 6A except that filters 710, 712, 714 are configured to filter different frequency ranges. In the illustrated embodiment, the switching circuit 700 comprises the antenna switch 706, such as, but not limited to an antenna switching module (ASM), and the filters 710, 712, 714, 716. The switching circuit 700 transmits an RF transmit signal to antennas 702, 704, receives an RF receive signal from the antennas 702, 704, and routes the RF receive signal through the appropriate filter to receiver circuitry for subsequent downconversion and baseband processing. The RF receive signal may be received as an FDD signal and/or a TDD signal and have specific frequency band configuration. For example, the signals can include single-band signals including data modulated onto single frequency bands, multi-band signals (also referred to as inter-band carrier aggregation signals) including data modulated onto multiple frequency bands, and/or data modulated onto multiple frequency bands using different communication protocols. The filter 710 can be configured to filter a frequency range of approximately 1427 MHz-approximately 2483 MHz, which includes the 2.4 GHz Wi-Fi band signals and the MB/HB1 signals (e.g., approximately 1427 MHz-approximately 2400 MHz). The filter 712 can be configured to filter a frequency range of approximately 2403 MHz-approximately 2960 MHz, which includes the 2.4 GHz Wi-Fi signals and the HB2 signals (e.g., 2496 MHz-2960 MHz). The filter 714 can be configured to filter the MB/HB1' signals, e.g., approximately 1427 MHz-approximately 2370 MHz. The filter 716 can be configured to filter the HB2 signals, e.g., approximately 2496 MHz-approximately 2690 MHz. Filters for UHB and LB are not illustrated. In an embodiment, the filters 710, 712, 714, 716 can comprise band pass filter(s). The filters 710, 712, 714, 716 can comprise surface acoustic wave (SAW) filters and/or bulk acoustic wave (BAW) filters.

Figure 7:
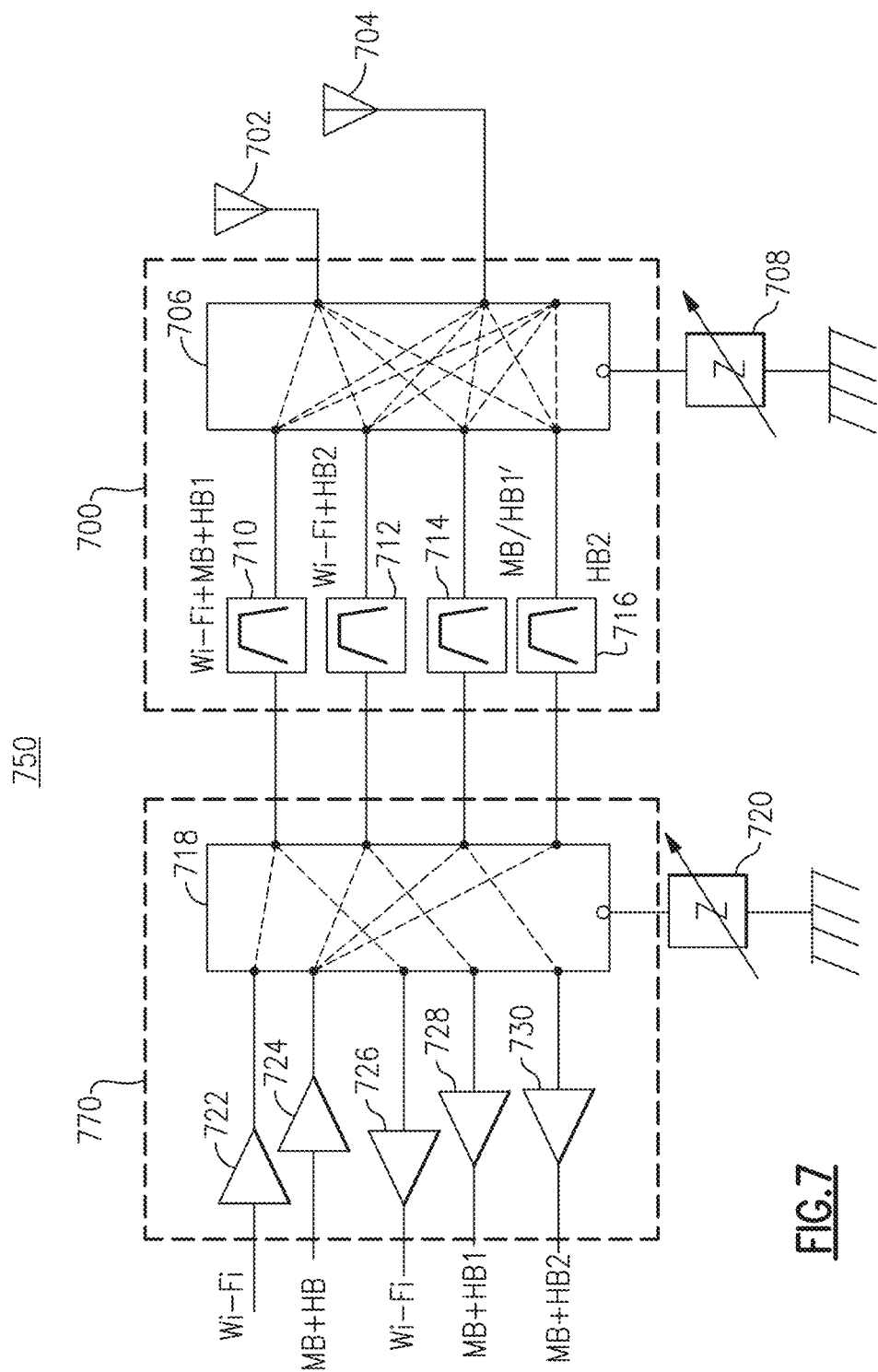
FIG. 7 is a schematic diagram of an embodiment of a switching circuit implemented in a front end configuration.

The antenna switch 706 can be configured to receive an antenna swapping signal through a control signal (not illustrated) from a baseband subsystem that includes a processor and/or is based at least in part on the frequency band configuration. Further, a sounding reference signal (SRS) can be transmitted to a base station through at least one of the antennas 702, 704. The antenna switch 706 can be a single-pole/multiple-throw (SPMT) switch, multi-pole/multi-throw (MPMT) switch, or a signal splitter that routes the signal to at least one of the plurality of paths corresponding to the frequency band of the single-band signal or the multi-band signal. The connection paths of the antenna switch 706 illustrated in FIG. 7 are for illustrative purposes only.

When the coexistence of the 2.4 GHz Wi-Fi signals and the cellular band signals, e.g., B40 (e.g., approximately 2300 MHz-approximately 2400 MHz), is utilized, the switch circuit 706 can be configured to route signals including the 2.4 GHz Wi-Fi band signals and the cellular band signals, e.g., B40, to the filter 712 for filtering the 2.4 GHz Wi-Fi signals and the filter 714 for filtering the cellular band signals. Alternatively, when the coexistence of the 2.4 GHz Wi-Fi signals and the cellular band signals, e.g., B41, is utilized, the switch circuit 706 can be configured to route signals including the 2.4 GHz Wi-Fi band signals and the cellular band signals, e.g., B41 (e.g., approximately 2496 MHz-approximately 2690 MHz) to the filter 710 for filtering the 2.4 GHz Wi-Fi frequency and the filter 716 for filtering the cellular band signals. The filter 710 can prevent or reduce insertion loss due to adjacent band edge roll-off with one or the other Wi-Fi band edge when the Wi-Fi band and the cellular band, e.g., B40, are not concurrently used. The filter 712 for filtering the 2.4 GHz Wi-Fi signals can prevent insertion loss due to adjacent band edge roll-off with one or the other Wi-Fi band edge when the Wi-Fi frequency band and the cellular band, e.g., B41, are not concurrently used. Further, when the coexistence of the 2.4 GHz Wi-Fi signals and the cellular band is not utilized, e.g., one of antennas 702, 704 receiving the 2.4 GHz Wi-Fi signals and the other one of the antenna 702, 704 receiving the cellular band signals, the 2.4 GHz Wi-Fi signals pass through one of the filters 710, 712 and the cellular band signals pass through corresponding one of the filters 710, 712, 714, 716. In an embodiment, the switch circuit can include another filter for filtering the MB/HB1, e.g., approximately 1427 MHz-approximately 2400 MHz instead of the filter 714 for filtering the MB/HB1'.

The amplifier assembly 770 can provide amplification for signals that pass through the amplifier assembly 770. The amplifier assembly 770 can provide amplification for a subset of the signal path through the switching circuit 700. The amplifier assembly 770 can comprise amplifiers 722, 724, 726, 728, 730 and an amplifier assembly switch 616. In an embodiment, the amplifiers 722, 724, 726, 728, 730 can comprise a variable-gain amplifier, a fixed-gain amplifier, a variable-current amplifier and/or a fixed-current amplifier.

The amplifier assembly switch 718 can be configured to receive a control signal from a baseband subsystem that includes a processor and/or is based at least in part on the frequency band configuration. The amplifier assembly switch 718 can be a single-pole/multiple-throw (SPMT) switch, multi-pole/multi-throw (MPMT) switch, or a signal splitter that routes the signal to at least one of the plurality of paths corresponding to the frequency band of the single-band signal or the multi-band signal. The connection paths of the amplifier assembly switch 718 illustrated in FIG. 7 are for illustrative purposes only.

The amplifiers 722, 724 can include a power amplifier. The amplifiers 722, 724 provide amplification for transmissions of the 2.4 GHz Wi-Fi signals and the cellular band signals, respectively. The amplifiers 726, 728, 730 can include a low noise amplifier. The amplifier assembly switch 716 and the antenna switch 700 can be correlated to reconfigure the switches to established suitable paths between the filters 710, 712, 714, 716 and the amplifiers 722, 724, 726, 728, 730 as discussed below. The amplifiers 722 and 726 amplify 2.4 GHz Wi-Fi signals. The amplifier 724 can amplify a frequency range of 1427 MHz-2690 MHz. The amplifiers 728, 730 can amplify frequency ranges of 1427 MHz-2400 MHz and 2403 MHz-2690 MHz, respectively. In an embodiment, the antenna assembly 770 can comprise a converged low noise amplifier similar to the converged low noise amplifier 680' illustrated in FIG. 6B instead of the low noise amplifiers 726, 728, 730.

When signals transmitted to or received from one of the antennas 702, 704 pass through the filter 710, the amplifier assembly switch 718 can be reconfigured the switches for the signals to pass through the amplifiers 726 and 728. When signals transmitted to or received from one of the antennas 702, 704 pass through the filter 712 for filtering the 2.4 GHz Wi-Fi signals, the amplifier assembly switch 718 can reconfigure the switches for the signals to pass through the amplifiers 726 and 730. When signals transmitted to or received from one of the antennas 702, 704 pass through the filter 714 for filtering the MB/HB1', the amplifier assembly switch 718 can reconfigure the switches for the signals to pass through the amplifier 728. When signals transmitted to or received from one of the antennas 702, 704 pass through the filter 716 for filtering the HB2 signals, the amplifier assembly switch 718 can reconfigure the switches for the signals to pass through the amplifier 730.

The front end configuration 750 can further comprise impedance matching circuits 708 and 720. The impedance matching circuits 708 and 720 can be connected to the antenna switch 700 and the amplifier assembly switch 718, respectively. The switch combination of the antenna switch 706 or the amplifier assembly switch 718, e.g., single path or multiple paths, may require changes in an impedance in order to match particular frequency ranges and filter impedance contour management challenges. The impedance matching circuits 708 and 720 are configured to provide targeted impedance for particular frequency band and particular frequency band combinations. The impedance matching circuits 708 and 720 are configured to be programmed to assume any suitable impedance depending on at least in part on selected signal paths or frequencies. In an embodiment, the impedance matching circuits 708 and 720 can comprise a switchable impedance circuit including at least one of a capacitor, an inductor and a resister. The switchable impedance circuit can include a number of different enable switches, e.g., field effect transistors (FET), to provide different value of a reactance to obtain switch tenability by adjusting on/off of the enable switches. Alternatively, the switchable impedance circuit can include at least one of a variable capacitor, and a variable inductor. The switchable impedance circuit can be connected to an end of the antennas 702, 704.

Figure 11:
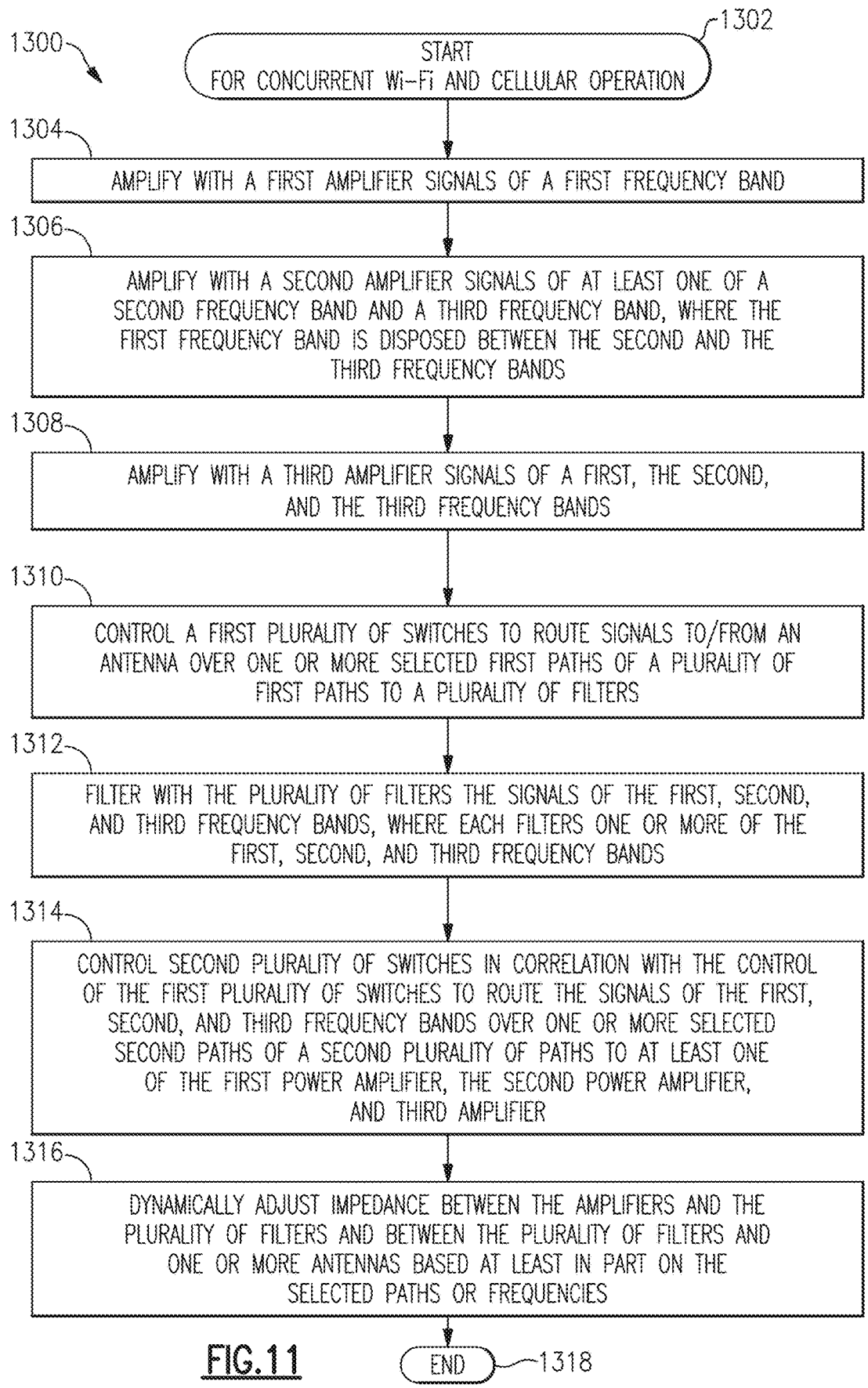
FIG. 11 is a flow chart of an exemplary process to route radio frequency signals on one or more paths between one or more filters and one or more amplifiers for concurrent cellular and Wi-Fi operation.

FIG. 11 is a flow chart of an exemplary process to route radio frequency signals on one or more paths between one or more filters and one or more amplifiers for concurrent cellular and Wi-Fi operation to provide improved front end module performance, size, and reduced antenna count. Referring to at least FIGS. 6A, 6B, 7 and FIG. 11, the process 1300 begins at START block 1302.

At block 1304, the process 1300 can amplify with a first amplifier signals of a first frequency band. At block 1306, the process 1300 can amplify with a second amplifier signals of at least one of a second frequency band and a third frequency band, where the first frequency band is disposed between the second and the third frequency bands. At block 1308, the process 1300 can amplify with a third amplifier signals of the first, the second, and the third frequency bands.

At block 1310, the process 1300 can control a first plurality of switches to route signals to/from an antenna over one or more selected first paths of a plurality of first paths to a plurality of filters. At block 1312, the process 1300 can filter with the plurality of filters the signals of the first, second, and third frequency bands, where each filter filters one or more of the first, second, and third frequency bands.

At block 1314, the process 1300 can control second plurality of switches in correlation with the control of the first plurality of switches to route the signals of the first, second, and third frequency bands over one or more selected second paths of a second plurality of paths to at least one of the first power amplifier, the second power amplifier, and third amplifier. At block 1316, the process 1300 can dynamically adjust impedance between the amplifiers and the plurality of filters and between the plurality of filters and one or more antennas based at least in part on the selected paths or frequencies. The process 1300 ends at END block 1318.

In some embodiments, the switch circuits 600, 600' 700 can further comprise a filter for filtering the 5 GHz Wi-Fi frequency signal. The switch circuits 200, 300, 400, 500 can be connected to an impedance matching circuit similar to the impedance matching circuits 608, 618, 608', 618', 708, 720. A front end configuration including one of the switch circuits 200, 300, 400, 500 can further comprise an amplifier assembly similar to the amplifier assemblies 670, 670', and 700.

Frequency bands illustrated in FIG. 1 are for illustration purposes only. When one or more antennas receive signals having two or more adjacent frequency bands concurrently, the switch circuits 200, 300, 400, 500, 600, 600', 700 can be utilized.

Figure 8A:
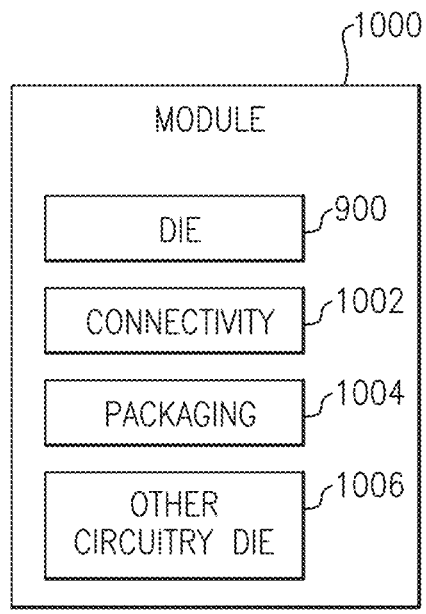
FIG. 8A is an exemplary block diagram of switching module.

FIG. 8A is an exemplary block diagram of switching module 1000. In an embodiment, a multimode semiconductor die 900 can include the switching and signal filtering circuit, such as signal filtering circuit 200, 300, 400, 500, 600, 600', or 700 that includes a filtering circuit, e.g., the filters 210, 212, 214, 216, 218, 310, 312, 314, 316, 318, 320, 322, 410, 412, 414, 416, 418, 420, 422, 510, 512, 514, 516, 518, 520, 610, 612, 614, 610', 612', 614', 710, 712, 714, 716 and a switching circuit, e.g., 206, 306, 406, 506, 606, 606', 706.

Figure 8B:
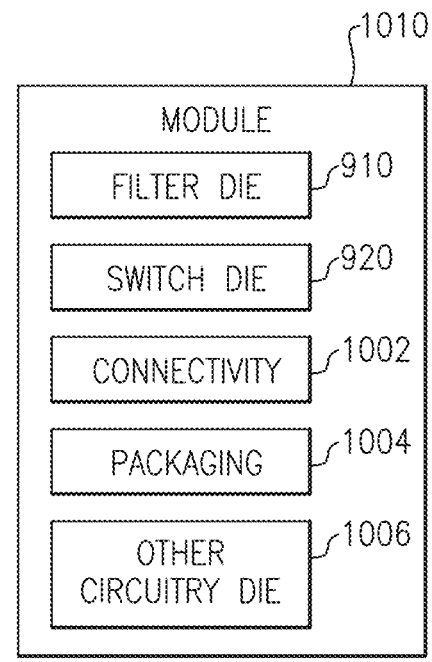
FIG. 8B is an exemplary block diagram of a multi-chip switching module.

FIG. 8B is an exemplary block diagram of a multi-chip switching module 1010. In an embodiment, a filter die 910 can include a filtering circuit, e.g., 210, 212, 214, 216, 218, 310, 312, 314, 316, 318, 320, 322, 410, 412, 414, 416, 418, 420, 422, 510, 512, 514, 516, 518, 520, 610, 612, 614, 610', 612', 614', 710, 712, 714, 716. A switch die 920 can include a switching circuit, e.g., 206, 306, 406, 506, 606, 606', 706.

Figure 8C:
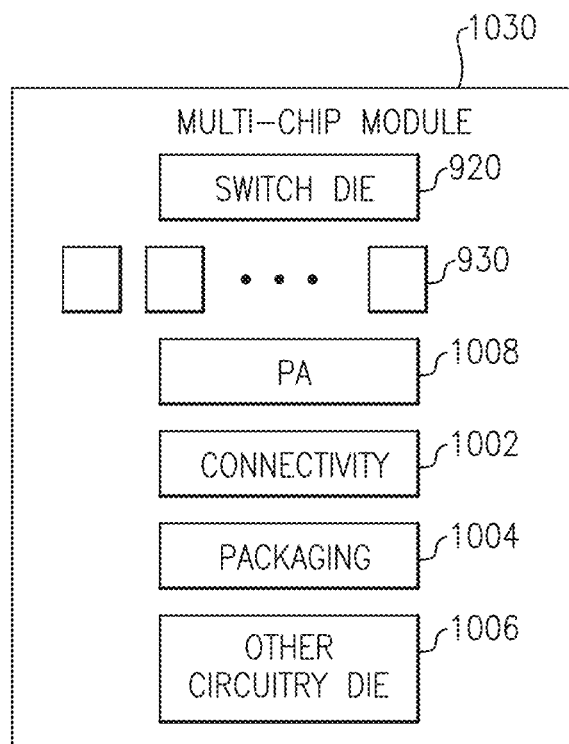
FIG. 8C is an exemplary block diagram of a multi-chip switching module including the switch die and a plurality of SAW filters.

FIG. 8C is an exemplary block diagram of a multi-chip switching module 1030 that can include the switch die 920 and a plurality of SAW filters. In an embodiment, the multi-chip module 1030 can further include power amplifier (PA) circuitry 1008.

The modules 1000, 1010, 1030 can further include connectivity 1002 to provide signal interconnections, packaging 1004, such as for example, a package substrate, for packaging of the circuitry, and other circuitry die 1006, such as, for example amplifiers, pre-filters, post filters modulators, demodulators, down converters, and the like, as would be known to one of skill in the art of semiconductor and multi-chip module fabrication in view of the disclosure herein.

Figure 9:
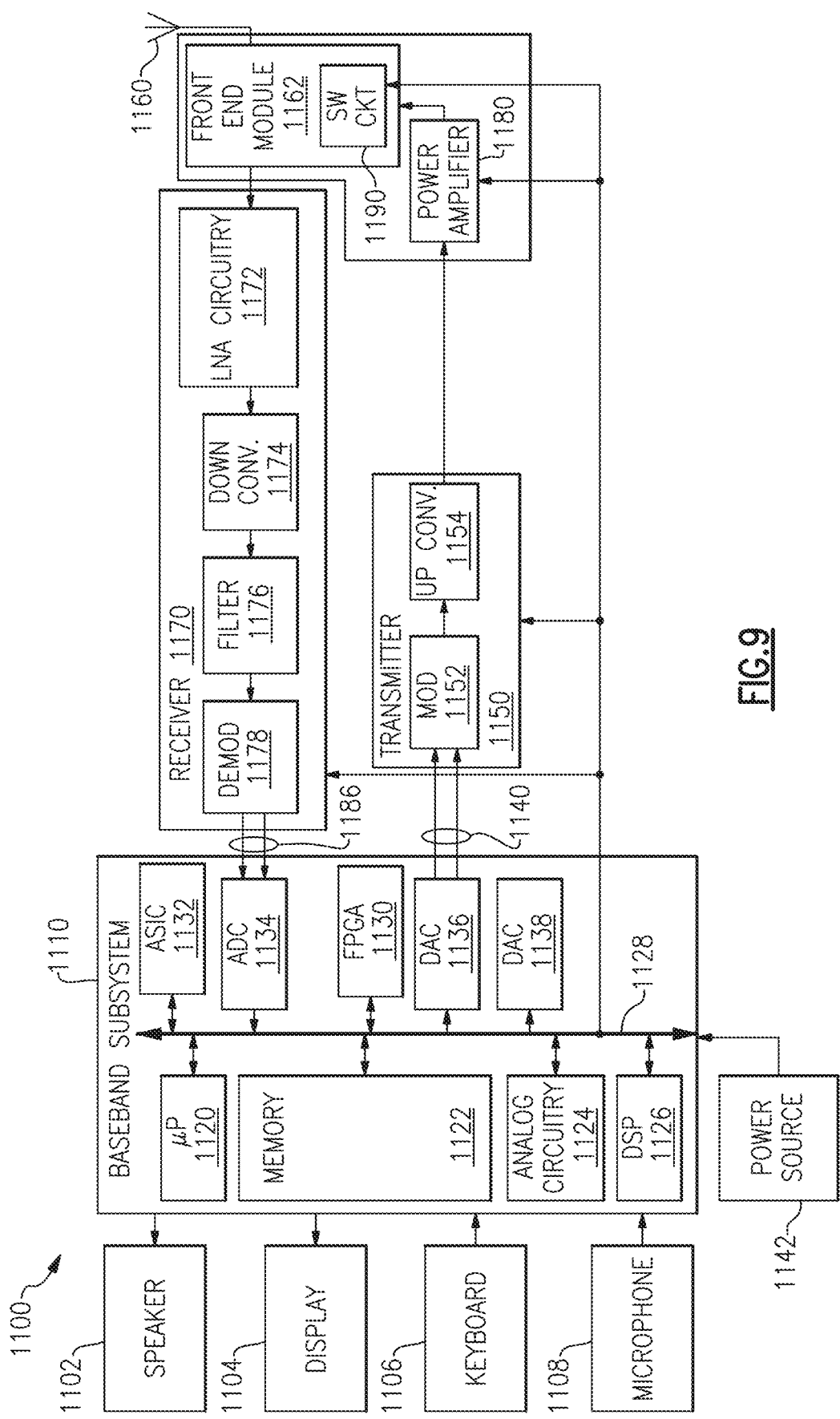
FIG. 9 is an exemplary block diagram illustrating a simplified wireless device including an embodiment of the switching and signal conditioning/filtering circuit.

FIG. 9 is an exemplary block diagram illustrating a simplified wireless device 1100 including an embodiment of the switching and signal conditioning/filtering circuit 206, 306, 406, 506, 606, 606', 706 configured to switch and condition/filter the RF transmit signal and the RF receive signal in order to implement selected frequency band configurations.

The wireless device 1100 includes a speaker 1102, a display 1104, a keyboard 1106, and a microphone 1108, all connected to a baseband subsystem 1110. A power source 1142, which may be a direct current (DC) battery or other power source, is also connected to the baseband subsystem 1110 to provide power to the wireless device 1100. In a particular embodiment, the wireless device 1100 can be, for example but not limited to, a portable telecommunication device such as a mobile cellular-type telephone. The speaker 1102 and the display 1104 receive signals from baseband subsystem 1110, as known to those skilled in the art. Similarly, the keyboard 1106 and the microphone 1108 supply signals to the baseband subsystem 1110. The baseband subsystem 1110 includes a microprocessor (μP) 1120, memory 1122, analog circuitry 1124, and a digital signal processor (DSP) 1126 in communication via bus 1128. Bus 1128, although shown as a single bus, may be implemented using multiple busses connected as necessary among the subsystems within the baseband subsystem 1110. The baseband subsystem 1110 may also include one or more of an application specific integrated circuit (ASIC) 1132 and a field programmable gate array (FPGA) 1130.

The microprocessor 1120 and memory 1122 provide the signal timing, processing, and storage functions for wireless device 1100. The analog circuitry 1124 provides the analog processing functions for the signals within baseband subsystem 1110. The baseband subsystem 1110 provides control signals to a transmitter 1150, a receiver 1170, a power amplifier 1180, and a switching module 1190, for example.

It should be noted that, for simplicity, only the basic components of the wireless device 1100 are illustrated herein. The control signals provided by the baseband subsystem 1110 control the various components within the wireless device 1100. Further, the function of the transmitter 1150 and the receiver 1170 may be integrated into a transceiver.

The baseband subsystem 1110 also includes an analog-to-digital converter (ADC) 1134 and digital-to-analog converters (DACs) 1136 and 1138. In this example, the DAC 1136 generates in-phase (I) and quadrature-phase (Q) signals 1140 that are applied to a modulator 1152. The ADC 1134, the DAC 1136, and the DAC 1138 also communicate with the microprocessor 1120, the memory 1122, the analog circuitry 1124, and the DSP 1126 via bus 1128. The DAC 1136 converts the digital communication information within baseband subsystem 1110 into an analog signal for transmission to the modulator 1152 via connection 1140. Connection 1140, while shown as two directed arrows, includes the information that is to be transmitted by the transmitter 1150 after conversion from the digital domain to the analog domain.

The transmitter 1150 includes the modulator 1152, which modulates the analog information on connection 1140 and provides a modulated signal to upconverter 1154. The upconverter 1154 transforms the modulated signal to an appropriate transmit frequency and provides the upconverted signal to the power amplifier 1180. The power amplifier 1180 amplifies the signal to an appropriate power level for the system in which the wireless device 1100 is designed to operate.

Details of the modulator 1152 and the upconverter 1154 have been omitted, as they will be understood by those skilled in the art. For example, the data on connection 1140 is generally formatted by the baseband subsystem 1110 into in-phase (I) and quadrature (Q) components. The I and Q components may take different forms and be formatted differently depending upon the communication standard being employed.

The power amplifier 1180 supplies the amplified signal to a front-end module 1162, where the amplified signal is conditioned and filtered by one or more signal conditioning filters for transmission. The front end module 1162 comprises an antenna system interface that may include, for example, the switching module 1190 comprising an embodiment of the switching and signal filtering circuit 400, 500, 600, 600' or 700 configured to switch a signal between the antenna 1160, the receiver 1170, and the power amplifier 1180 (receiving the RF transmit signal from the transmitter 1150), as described herein to implement FDD and TDD in a shared band. In an embodiment, the PA circuitry 1008 comprises the power amplifier 1180. The RF transmit signal is supplied from the front-end module 1162 to the antenna 1160. In an embodiment, the antenna 1160 comprises an FDD/TDD antenna.

In an embodiment, the front-end module 1162 comprises the switching module 1190. In an embodiment, switching module 1190 comprises the switching module 1000 including the semiconductor die 900. In another embodiment, switching module 1190 comprises the switching module 1010 including the filtering semiconductor die 910 and the switching semiconductor die 920. In a further embodiment, the switching module 1190 comprises the multi-chip module 1030 including one or more SAW filters 930 and the switching semiconductor die 920. In these embodiments, the switching module 1190 comprises an embodiment of the switching and signal filtering circuit 400, 500, 600, 600' or 700

A signal received by antenna 1160 will be directed from the front-end module 1162 to the receiver 1170. The receiver 1170 includes low noise amplifier circuitry 1172, a downconverter 1174, a filter 1176, and a demodulator 1178.

If implemented using a direct conversion receiver (DCR), the downconverter 1174 converts the amplified received signal from an RF level to a baseband level (DC), or a near-baseband level (approximately 100 kHz). Alternatively, the amplified received RF signal may be downconverted to an intermediate frequency (IF) signal, depending on the application. The downconverted signal is sent to the filter 1176. The filter 1176 comprises a least one filter stage to filter the received downconverted signal as known in the art.

The filtered signal is sent from the filter 1176 to the demodulator 1178. The demodulator 1178 recovers the transmitted analog information and supplies a signal representing this information via connection 1186 to the ADC 1134. The ADC 1134 converts these analog signals to a digital signal at baseband frequency and transfers the signal via bus 1128 to the DSP 1126 for further processing.

Terminology

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize in view of the disclosure herein.

For example, while processes or blocks are presented in a given order, alternative embodiments may perform routines having steps, or employ systems having blocks, in a different order, and some processes or blocks may be deleted, moved, added, subdivided, combined, and/or modified. Each of these processes or blocks may be implemented in a variety of different ways. In addition, while processes or blocks are at times shown as being performed in series, these processes or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A switching circuit for switching radio frequency signals, comprising:
    a first filter configured to concurrently filter first signals in a combination of frequency bands that include a first cellular frequency band, a wireless area network frequency band, and a second cellular frequency band to reduce insertion loss and frequency roll-off at edges of adjacent bands, the first cellular frequency band adjacent to the wireless area network frequency band, the second cellular frequency band adjacent to the wireless area network frequency band, a gap band between the first cellular frequency band and the wireless area network frequency band;
    a second filter configured to filter second signals in the wireless area network frequency band; and
    a plurality of switches configured to route radio frequency signals from an antenna through the first filter and the second filter for concurrent cellular and Wi-Fi operation.

2. The switching circuit of claim 1 wherein, a gap band is between the wireless area network frequency band and the second cellular frequency band.

3. The switching circuit of claim 2 further comprising a third filter configured to filter the first cellular frequency band and the second cellular frequency band and to pass the wireless area network frequency band.

4. The switching circuit of claim 3 wherein the plurality of switches is configured not to route the signals from the antenna through the first filter and the third filter at the same time.

5. The switching circuit of claim 1 further comprising a third filter configured to filter another wireless local area network band.

6. The switching circuit of claim 1 further comprising an impedance matching circuit in communication with the plurality of switches and configured to adjust impedance of a path between the antenna and the first and second filters.

7. The switching circuit of claim 1 at least one of the first and second filters is a surface acoustic wave filter.

8. The switching circuit of claim 1 wherein at least one of the first and second filters is a bulk acoustic wave filter.

9. A front end module comprising:
a switching circuit for concurrent cellular and Wi-Fi operation that includes a first filter configured to concurrently filter first signals in a combination of frequency bands that include a first cellular frequency band, a wireless area network frequency band, and a second cellular frequency band to reduce insertion loss and frequency roll-off at edges of adjacent bands, the first cellular frequency band adjacent to the wireless area network frequency band, the second cellular frequency band adjacent to the wireless network frequency band, a gap band between the first cellular frequency band and the wireless area network frequency band, a second filter configured to filter second signals in the wireless area network frequency band, and a first plurality of switches configured to route radio frequency signals from an antenna through the first and second filters; and
an amplifier assembly configured to receive the radio frequency signals from the switching circuit and amplify the radio frequency signals.

10. The front end module of claim 9 further comprising an impedance matching circuit in communication with the switching circuit and configured to adjust impedance of a path between the antenna and the first and the second filters.

11. The front end module of claim 9 wherein the amplifier assembly includes a first power amplifier configured to amplify the first cellular frequency band, a second power amplifier configured to amplify the wireless area network frequency band, and a second plurality of switches configured to route the signals to one of the first power amplifier and the second power amplifier.

12. The front end module of claim 11 further comprising an impedance matching circuit connected to the amplifier assembly and configured to adjust impedance of a path between the switching circuit and the first and the second amplifiers.

13. The front end module of claim 9 wherein the amplifier assembly includes a converged power amplifier configured to amplify the first cellular frequency band and the wireless area network frequency band.

14. The switching circuit of claim 9 wherein at least one of the first and second filters is a surface acoustic wave filter.

15. A switching circuit comprising:
for concurrent cellular and Wi-Fi operation,
a first filter configured to concurrently filter first signals in a combination of frequency bands that include a first cellular frequency band, a wireless area network frequency band, a second cellular frequency band, and a third frequency band to reduce insertion loss and frequency roll-off at edges of adjacent bands, the first cellular frequency band adjacent to the wireless area network frequency band and the third frequency band, the second cellular frequency band that is adjacent to the wireless area network frequency band, a gap band between the first cellular frequency band and the wireless area network frequency band frequency band;
a second filter configured to filter second signals in the wireless area network frequency band;
a third filter configured to filter third signals in the third frequency band, a first portion of the first cellular frequency band and the second cellular frequency band; and
a plurality of switches configured to route radio frequency signals from an antenna through (i) the second and third filters, or (ii) the first filter.

16. The switching circuit of claim 15 further comprising a fourth filter configured to filter fourth signals in another wireless area network frequency band.

17. The switching circuit of claim 15 wherein at least one of the first, second and third filters is a surface acoustic wave filter.

18. The switching circuit of claim 15 wherein a first gap band between the second cellular frequency band and the wireless area network frequency band is larger than the gap band between the first cellular frequency band and the wireless area network frequency band.

19. The switching circuit of claim 15 wherein at least one of the first and second filters is a bulk acoustic wave filter.

20. The switching circuit of claim 15 further comprising an impedance matching circuit in communication with the plurality of switches and configured to adjust impedance of a path between the antenna and the first, second, and third filters.

21. The switching circuit of claim 15 wherein the first portion of the first cellular frequency band is used for time division duplex communication.

* * * * *